US012651944B2

(12) United States Patent (10) Patent No.: US 12,651,944 B2

Kaneko (45) Date of Patent: Jun. 9, 2026

(54) ELECTRIC MOTOR

(71) Applicant: Mitsubishi Electric Corporation, Tokyo (JP)

(72) Inventor: Kenta Kaneko, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 321 days.

(21) Appl. No.: 18/262,210

(22) PCT Filed: Apr. 5, 2021

(86) PCT No.: PCT/JP2021/014553
§ 371 (c)(1),
(2) Date: Jul. 20, 2023

(87) PCT Pub. No.: WO2022/215144
PCT Pub. Date: Oct. 13, 2022

(65) Prior Publication Data
US 2024/0088754 A1 Mar. 14, 2024

(51) Int. Cl.
*H02K 9/22* (2006.01)
*H02K 1/20* (2006.01)
(Continued)

(52) U.S. Cl.
CPC .............. *H02K 9/227* (2021.01); *H02K 1/20* (2013.01); *H02K 1/32* (2013.01); *H02K 9/06* (2013.01)

(58) Field of Classification Search
CPC ............ H02K 5/20; H02K 5/207; H02K 1/20; H02K 1/32; H02K 9/18; H02K 9/227; H02K 9/06
See application file for complete search history.

(56) References Cited

U.S. PATENT DOCUMENTS

2004/0150270 A1 8/2004 Nagayama et al.
2006/0226717 A1* 10/2006 Nagayama ............... H02K 9/06
310/58
(Continued)

FOREIGN PATENT DOCUMENTS

JP 2004194498 A 7/2004
JP 2007097325 A * 4/2007 ............... H02K 9/06
(Continued)

OTHER PUBLICATIONS

WO2020049715A1—Translation (Year: 2025).*
(Continued)

*Primary Examiner* — Christopher M Koehler
*Assistant Examiner* — Ahmed F Seck
(74) *Attorney, Agent, or Firm* — BUCHANAN, INGERSOLL & ROONEY PC

(57) ABSTRACT

An electric motor includes a shaft, a rotor, a stator, a first bracket, a second bracket, a heat exchanger, a first guide, and a second guide. The heat exchanger includes an internal air bypass located radially outward from the internal air passage of the stator, and an external air bypass located radially outward from the internal air bypass and continuous to the external space. The heat exchanger further includes a heat transfer member to separate the internal air bypass and the external air bypass, and transfer heat from the internal air flowing in the internal air bypass to the external air flowing in the external air bypass.

20 Claims, 20 Drawing Sheets

(51) Int. Cl.
    *H02K 1/32*        (2006.01)
    *H02K 9/06*        (2006.01)

(56)                References Cited

U.S. PATENT DOCUMENTS

2007/0273220 A1 * 11/2007 Koyama .................. H02K 9/14
                                                310/58
2018/0226858 A1 * 8/2018 Mas ...................... F04D 19/002

FOREIGN PATENT DOCUMENTS

WO      WO2018235969 A1 * 12/2018 ............... H02K 1/20
WO      WO2020049715 A1 * 3/2020 ............... H02K 1/32

OTHER PUBLICATIONS

WO2018235969A1—Translation (Year: 2025).*
JP2007097325A—Translation (Year: 2025).*
International Search Report (PCT/ISA/210) with English translation and Written Opinion (PCT/ISA/237) mailed on Jun. 8, 2021, by the Japanese Patent Office as the International Searching Authority for International Application No. PCT/JP2021/014553.

* cited by examiner

FIG.1

ELECTRIC MOTOR

TECHNICAL FIELD

The present disclosure relates to an electric motor.

BACKGROUND ART

Electric motors include a shaft, a rotor fixed to the shaft and rotatable integrally with the shaft, and a stator radially opposing the rotor with a space therebetween. Energization of the electric motor causes rises in the temperatures of the stator and the rotor. Temperature rises in the electric motor promote degradation of the insulating properties of coils included in the electric motor, and promote degradation of grease for lubricating bearings in the electric motor, for example, and thus may adversely affect the remaining life of the electric motor.

In electric motors of a totally enclosed type installed under the floor of a railway vehicle, the external air indicating the air outside the electric motor is caused to flow through air passages formed in a stator, and the internal air indicating the air inside the electric motor is caused to flow through air passages formed in a rotor, so that these flows of air cool the stator and the rotor. The internal air has a higher temperature than the external air and thus has lower cooling efficiency than the external air. In order to improve the cooling efficiency of such an electric motor of a totally enclosed type that uses the external air and the internal air to cool the stator and the rotor, the electric motor preferably generates circulation of the internal air while suppressing a temperature rise in the internal air.

Patent Literature 1 discloses an electric motor that includes a stator and a rotor each having air passages, and is provided with a heat exchanging device outside the electric motor, specifically, at a position on a radially outside of the stator and apart from the stator. The heat exchanging device has an air passage in communication with the internal space of the electric motor. In the electric motor disclosed in Patent Literature 1, the external air is caused to flow through the air passages in the stator, and the internal air is caused to flow through the air passages in the rotor, so that these flows of air cool the stator and the rotor. The electric motor suppresses a temperature rise in the internal air, because the internal air is caused to flow through the air passage of the heat exchanging device including fins arranged across the entire outer peripheral surface.

CITATION LIST

Patent Literature

Patent Literature 1: Unexamined Japanese Patent Application Publication No. 2004-194498

SUMMARY OF INVENTION

Technical Problem

The heat exchanging device of the electric motor disclosed in Patent Literature 1 is disposed at a position apart from the stator. In addition, the fins are arranged across the entire outer peripheral surface of the heat exchanging device. The electric motor disclosed in Patent Literature 1 has higher cooling efficiency than an electric motor of a totally enclosed type including no heat exchanging device, but suffers from an increase in the size, specifically, an increase in the radial size.

An objective of the present disclosure, which has been accomplished in view of the above situations, is to provide a compact electric motor having high cooling efficiency.

Solution to Problem

In order to achieve the above objective, an electric motor according to an aspect of the present disclosure includes, a shaft, a rotor, a stator, a first bracket, a second bracket, a heat exchanger, a first guide, and a second guide. The shaft is supported rotatably about a rotation axis. The rotor is located radially outward from the shaft and rotatable integrally with the shaft. The stator radially opposes the rotor with a space therebetween, and has an external air passage and an internal air passage, which are each a through hole open at both ends in the direction of extension of the rotation axis. The first bracket has an inlet hole through which external air is introduced. The second bracket opposes the first bracket in the direction of extension of the rotation axis with the rotor and the stator being located between the second bracket and the first bracket. The heat exchanger includes an internal air bypass located radially outward from the internal air passage, an external air bypass located radially outward from the internal air bypass and continuous to an external space, and a heat transfer member to separate the internal air bypass and the external air bypass, and transfer heat from internal air flowing in the internal air bypass to the external air flowing in the external air bypass. The first guide is disposed between the first bracket and the stator, to guide the external air drawn in via the inlet hole to the external air passage, and to prevent the inflow external air from entering the internal air passage and the internal air bypass. The second guide is disposed between the second bracket and the stator, to guide the external air after passing through the external air passage to the external space, guide the internal air to the internal air passage and the internal air bypass, and prevent the external air from entering the internal air passage and the internal air bypass.

Advantageous Effects of Invention

The electric motor according to an aspect of the present disclosure includes the heat exchanger including the internal air bypass, the external air bypass, and the heat transfer member to separate the internal air bypass and the external air bypass and transfer heat from the internal air flowing in the internal air bypass to the external air flowing in the external air bypass. Since the heat transfer member for separating the internal air bypass from the external air bypass transfers heat from the internal air flowing in the internal air bypass to the external air flowing in the external air bypass, the heat exchanger has a simple structure without air passages having fins across the entire outer peripheral surface and can suppress a temperature rise in the internal air. This structure can achieve a compact electric motor having high cooling efficiency.

BRIEF DESCRIPTION OF DRAWINGS

FIG. 1 is a cross-sectional view of an electric motor according to Embodiment 1;

DESCRIPTION OF EMBODIMENTS

Figure 2:
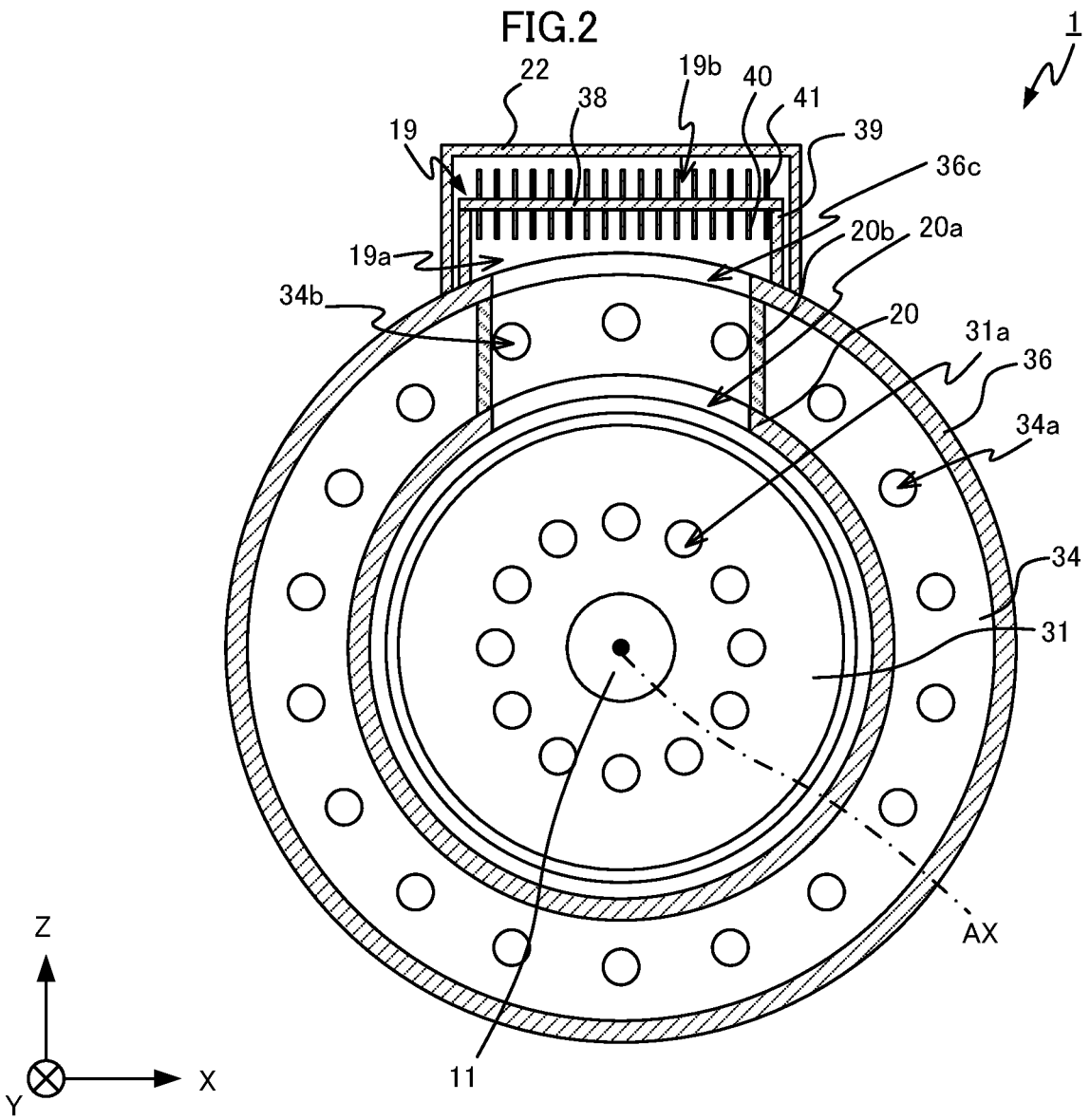
FIG. 2 is a cross-sectional view of the electric motor according to Embodiment 1 taken along the line II-II of FIG. 1.

An electric motor according to embodiments of the present disclosure is described in detail below with reference to the accompanying drawings. In the drawings, the components identical or corresponding to each other are provided with the same reference symbol.

Embodiment 1

Figure 1:
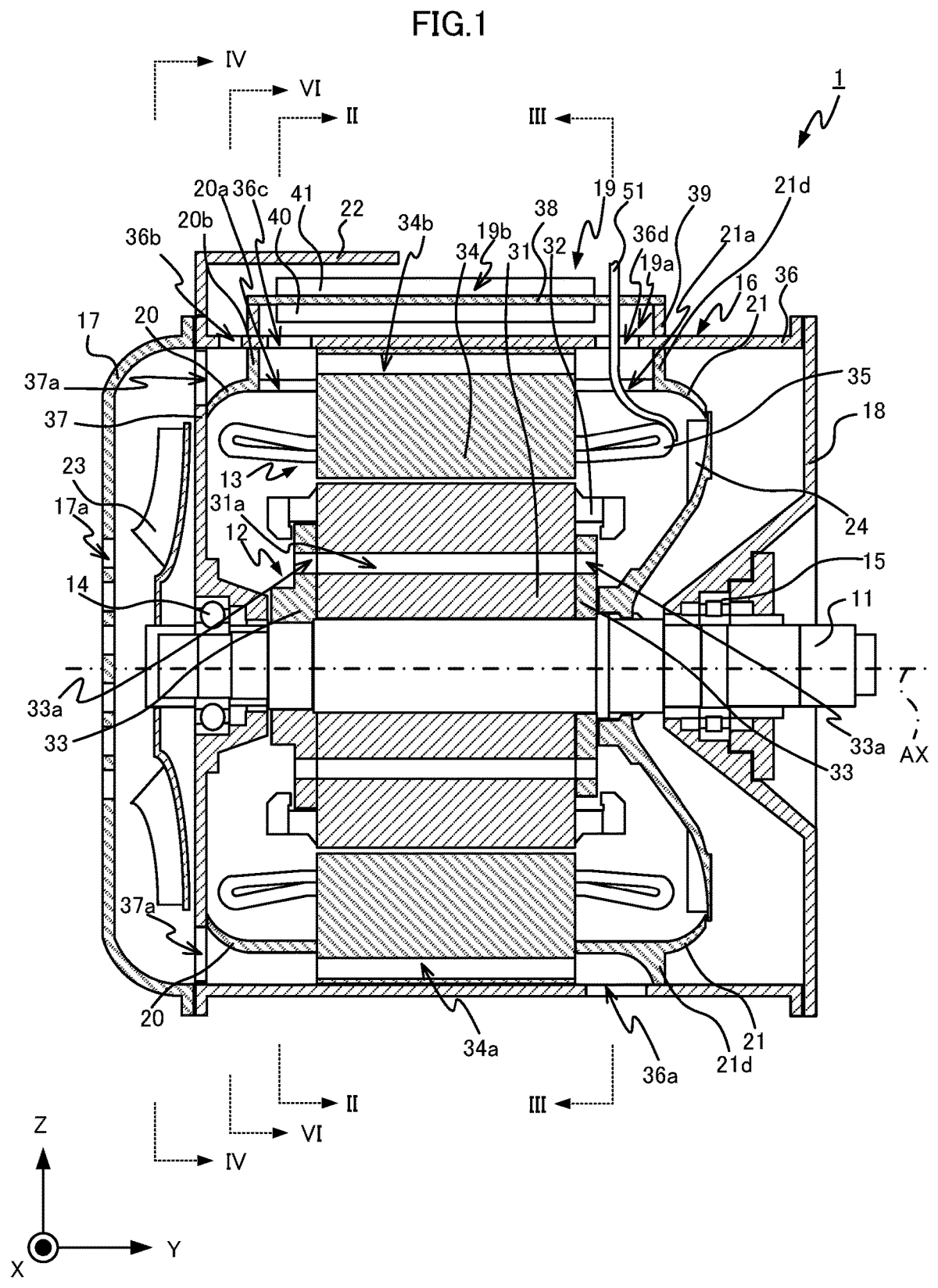

An electric motor 1 according to Embodiment 1 is described below focusing on an exemplary electric motor of a totally enclosed type for driving a railway vehicle. The electric motor 1 illustrated in FIG. 1 is installed under the floor of the railway vehicle. The electric motor 1 uses flows of the external air indicating the air outside the electric motor 1 and the internal air indicating the air inside the electric motor 1 to cool the components of the electric motor 1. The electric motor 1 has a structure for preventing the external air containing contaminants therein from entering the flow paths of the internal air. In FIG. 1, the Z-axis direction indicates the vertical direction. The Y-axis direction indicates the width direction of the railway vehicle. The X-axis direction indicates the traveling direction of the railway vehicle. In other words, the railway vehicle travels toward the positive side in the X-axis direction or the negative side in the X-axis direction. The X, Y, and Z axes are orthogonal to each other.

The electric motor 1 includes a shaft 11 supported rotatably about a rotation axis AX represented with the dashed and single-dotted line in FIG. 1, a rotor 12 located radially outward from the shaft 11 and rotatable integrally with the shaft 11, a stator 13 radially opposing the rotor 12 with a space therebetween, and bearings 14 and 15 to rotatably support the shaft 11. The electric motor 1 further includes a frame 16 to accommodate the rotor 12, the stator 13, and the bearings 14 and 15 while the shaft 11 extends through the frame 16, a first bracket 17 and a second bracket 18 to hold the frame 16 therebetween in the direction of extension of the rotation axis AX, and a heat exchanger 19 having an internal air bypass 19a and an external air bypass 19b to transfer heat from the internal air to the external air.

The electric motor 1 also includes a first guide 20 to guide the external air to external air passages 34a provided in the stator 13 and to the external air bypass 19b, a second guide 21 to guide the internal air to internal air passages 34b provided in the stator 13 and to the internal air bypass 19a, and a cover 22 disposed over at least a part of the external air bypass 19b to guide the external air to the external air bypass 19b. The electric motor 1 further includes an outer-facing fan 23 attached to the shaft 11 to rotate and thereby cause the external air to be introduced, and an inner-facing fan 24 attached to the shaft 11 to rotate and thereby cause the internal air to circulate.

In the electric motor 1 having the above-described structure, a part of the external air introduced through inlet holes 17a provided in the first bracket 17 flows radially in accordance with rotation of the outer-facing fan 23, is guided by the first guide 20 to the external air passages 34a, flows through the external air passages 34a, and is then discharged through outlet holes 36a provided in the frame 16. Another part of the external air flows radially in accordance with rotation of the outer-facing fan 23, is guided by the first guide 20 to the external air bypass 19b, flows in the external air bypass 19b exposed to the external space of the electric motor 1, and is then discharged to the external space.

The internal air flows radially in accordance with rotation of the inner-facing fan 24, and is then guided by the second guide 21 to the internal air passages 34b and the internal air bypass 19a. The internal air after passing through the internal air passages 34b or the internal air bypass 19a is guided by the first guide 20 to rotor air passages 31a provided in the rotor 12. The internal air after passing through the rotor air passages 31a flows radially in accordance with rotation of the inner-facing fan 24. The internal air circulates inside the electric motor 1 as described above.

In the heat exchanger 19, heat is transferred from the internal air flowing in the internal air bypass 19a to the external air flowing in the external air bypass 19b, resulting in a decrease in temperature of the internal air. This mechanism can improve the cooling efficiency of the electric motor 1. The heat exchanger 19 has such a simple structure that the heat exchanger 19 defines the internal air bypass 19a with the frame 16 and the external air bypass 19b on the outer peripheral surface. The electric motor 1 thus is a compact electric motor having high cooling efficiency.

The components of the electric motor 1 are described in detail below.

The end of the shaft 11 closer to the second bracket 18 is coupled to the axle of the railway vehicle via joints and gears, which are not illustrated. The rotation of the shaft 11 causes generation of a propulsive force of the railway vehicle.

The rotor 12 includes a rotor core 31 provided to the shaft 11, rotor conductors 32 disposed in the slots provided on the outer peripheral surface of the rotor core 31, and a pair of holding members 33 to hold the rotor core 31 therebetween in the direction of the rotation axis AX and thereby stabilize the rotor core 31. The rotor core 31 has the rotor air passages 31a, which are through holes open at both ends in the direction of extension of the rotation axis AX. In Embodiment 1, the rotor air passages 31a extend through the rotor core 31 in the direction of extension of the rotation axis AX, that is, in the Y-axis direction. As illustrated in FIG. 2, which is a cross-sectional view taken along the line II-II of FIG. 1, the rotor air passages 31a are arranged in the circumferential direction in the rotor core 31. FIG. 2 does not illustrate the rotor conductors 32, the holding members 33, or stator conductors 35, in order to simplify the figure.

As illustrated in FIG. 1, each of the holding members 33 has through holes 33a in communication with the rotor air passages 31. The through holes 33a extend through the holding members 33 in the Y-axis direction. The internal air flows through the through holes 33a in one of the pair of holding members 33, the rotor air passages 31a, and the through holes 33a in the other of the pair of holding members 33 in sequence, so that heat generated in the rotor 12 is transferred to the internal air. This mechanism can cool the rotor 12.

The stator 13 includes a stator core 34 provided to the inner peripheral surface of the frame 16, and the stator conductors 35 inserted in slots provided in the stator core 34. The stator core 34 radially opposes the rotor core 31 with a space therebetween. The stator core 34 has the external air passages 34a and the internal air passages 34b. The external air passages 34a and the internal air passages 34b are through holes open at both ends in the direction of extension of the rotation axis AX. In Embodiment 1, the external air passages 34a and the internal air passages 34b extend through the stator core 34 in the Y-axis direction. As illustrated in FIG. 2, the external air passages 34a and the internal air passages 34b are arranged in the circumferential direction in the stator core 34. In detail, the internal air passages 34b are located in the vertically upper portion of the stator core 34, while the external air passages 34a are located in the portion other than the vertically upper portion of the stator core 34.

As illustrated in FIG. 1, the stator conductors 35 are connected to a lead wire 51 leading from the external space of the electric motor 1. The stator conductors 35 are fed with an electrical current via the lead wire 51, so that the electric motor 1 operates.

The bearing 14 is retained by the frame 16 and rotatably supports the shaft 11.

The bearing 15 is retained by the second bracket 18 and rotatably supports the shaft 11.

The frame 16 is fixed under the floor of the railway vehicle with fixing members, which are not illustrated. The frame 16 has a hollow tubular shape. In Embodiment 1, the frame 16 includes a tubular member 36 having a hollow tubular shape, and a plate member 37 to close one end of the tubular member 36 and support the bearing 14.

The end of the tubular member 36 closer to the second bracket 18 has the outlet holes 36a through which the external air after passing through the external air passages

Figure 3:
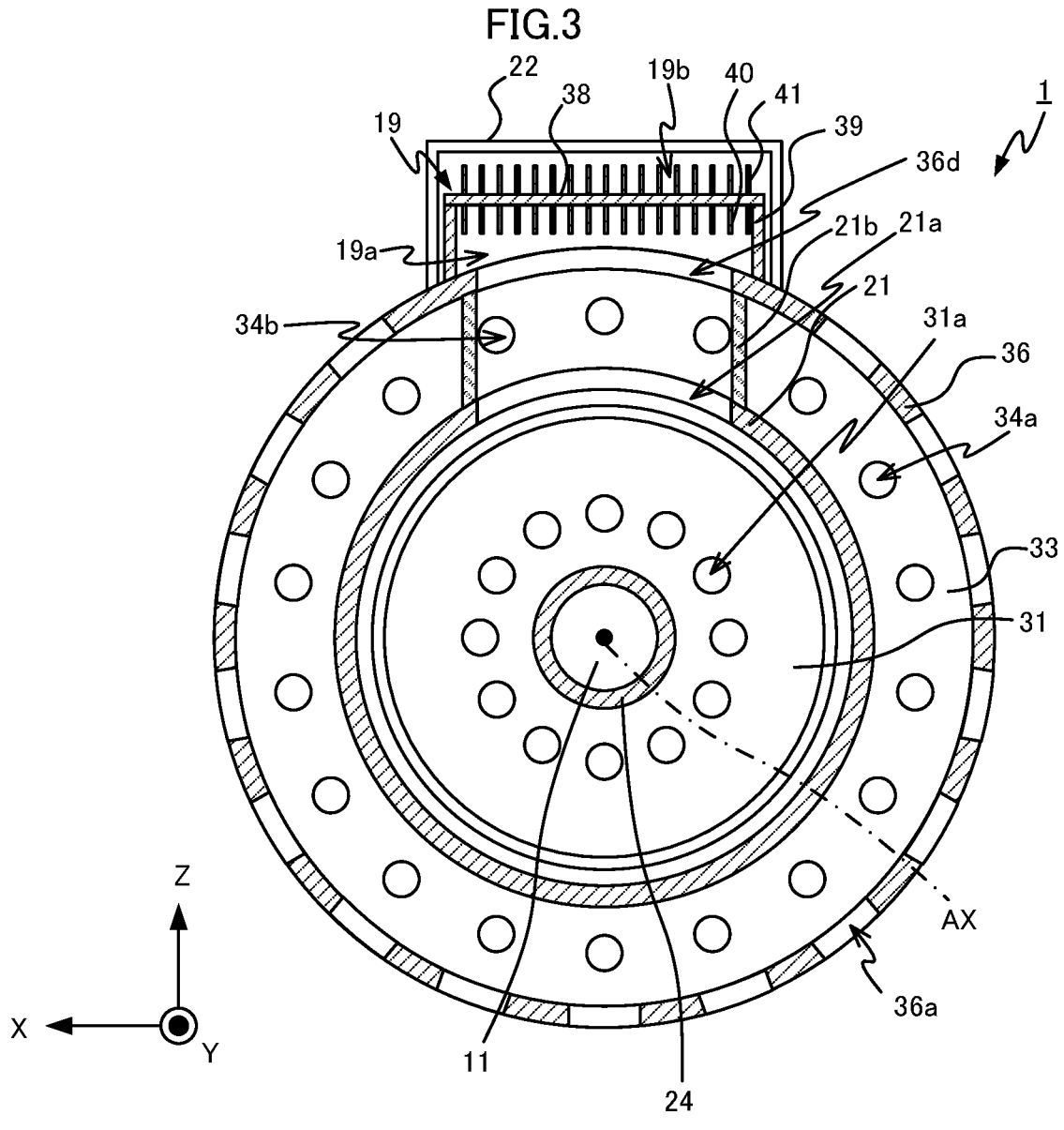
FIG. 3 is a cross-sectional view of the electric motor according to Embodiment 1 taken along the line III-III of FIG. 1.

34a is discharged to the external space. The end of the tubular member 36 closer to the second bracket 18 indicates a portion of the tubular member 36 closer to the second bracket 18 than the stator 13. In Embodiment 1, as illustrated in FIG. 3, which is a cross-sectional view taken along the line III-III of FIG. 1, the portion other than the vertically upper portion of the tubular member 36 has the outlet holes 36a arranged in the circumferential direction. The outlet holes 36a radially extend through the tubular member 36. As illustrated in FIG. 1, the vertically upper portion of the tubular member 36 has a first air hole 36b continuous to the external air bypass 19b, and a second air hole 36c and a third air hole 36d continuous to the internal air bypass 19a.

Figure 4:
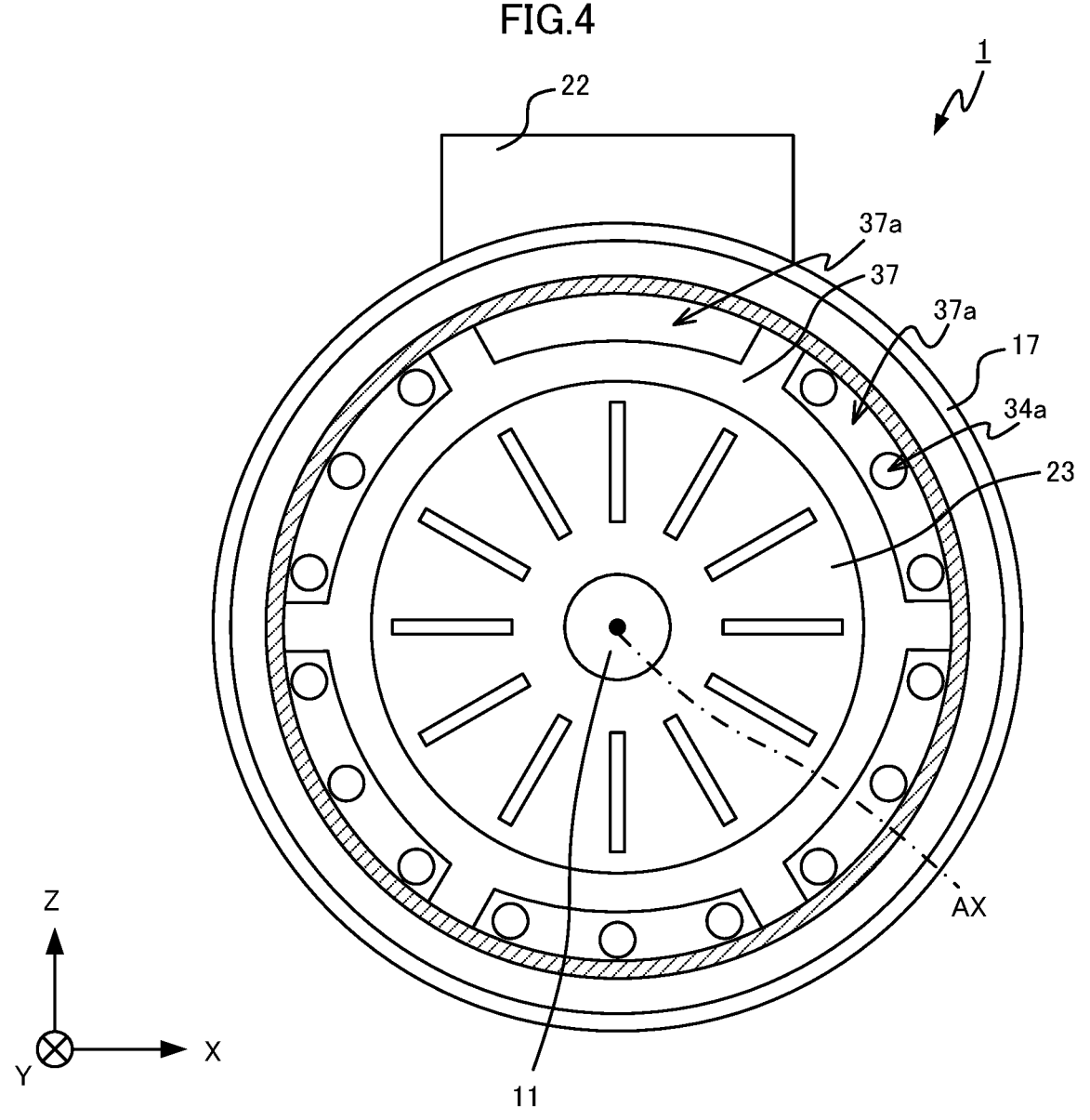
FIG. 4 is a cross-sectional view of the electric motor according to Embodiment 1 taken along the line IV-IV of FIG. 1.

As illustrated in FIG. 4, which is a cross-sectional view taken along the line IV-IV of FIG. 1, the plate member 37 has end-face air holes 37a arranged in the circumferential direction. The end-face air holes 37a extend through the plate member 37 in the Y-axis direction.

As illustrated in FIG. 1, the first bracket 17 has the inlet holes 17a through which the external air is introduced. The first bracket 17 is attached to one end of the frame 16, specifically, the end of the tubular member 36 on the negative side in the Y-axis direction.

The second bracket 18 opposes the first bracket 17 with the rotor 12 and the stator 13 being located between the second bracket 18 and the first bracket 17 in the Y-axis direction. In Embodiment 1, the second bracket 18 is attached to the other end of the frame 16 for accommodating the rotor 12 and the stator 13, specifically, the other end of the tubular member 36 on the positive side in the Y-axis direction.

As illustrated in FIGS. 2 and 3, the heat exchanger 19 includes the internal air bypass 19a located radially outward from the internal air passages 34b, the external air bypass 19b located radially outward from the internal air bypass 19a and continuous to the external space, and a heat transfer member 38 to separate the internal air bypass 19a and the external air bypass 19b. The heat transfer member 38 is mounted on a fitting member 39 fixed on the outer peripheral surface of the tubular member 36. The fitting member 39 has a hollow tubular shape having a rectangular section, and is fixed to the tubular member 36 in such an orientation that the central axis intersects the outer peripheral surface of the tubular member 36.

The space surrounded by the heat transfer member 38, the fitting member 39, and the tubular member 36 of the frame 16 defines the internal air bypass 19a. The heat transfer member 38 has a through hole through which the lead wire 51 extends. The through hole is provided with a cable gland, for example, to reduce contaminants, such as dust and water drops, from entering the electric motor 1 via the through hole.

The heat transfer member 38 is preferably a plate member made of a material having a high thermal conductivity, for example, a metal, such as copper or aluminum. The heat transfer member 38 made of a material having a high thermal conductivity facilitates heat to be transferred from the internal air flowing in the internal air bypass 19a to the external air flowing in the external air bypass 19b, resulting in a decrease in temperature of the internal air. This configuration can improve the cooling efficiency of the electric motor 1. In order to further improve the cooling efficiency of the electric motor 1, the heat transfer member 38 is preferably made of a thin plate having a thickness of at most one millimeter, for example. The heat transfer member 38 made of a thin plate facilitates heat to be efficiently transferred from the internal air flowing in the internal air bypass 19a to the external air flowing in the external air bypass 19*b*, resulting in a further decrease in temperature of the internal air. This configuration can further improve the cooling efficiency of the electric motor 1.

The heat exchanger 19 further includes multiple inner fins 40 disposed with spaces therebetween on a surface of the heat transfer member 38 within the internal air bypass 19*a*, and multiple outer fins 41 disposed with spaces therebetween on the surface of the heat transfer member 38 opposite to the surface provided with the inner fins 40. The inner fins 40 and the outer fins 41 have the main surfaces parallel to the YZ plane. The air gaps between the outer fins 41 define the external air bypass 19*b*.

As illustrated in FIG. 1, the first guide 20 is disposed between the first bracket 17 and the stator 13. The first guide 20 guides the external air drawn in via the inlet holes 17*a* to the external air passages 34*a* and the external air bypass 19*b*, and prevents the external air from entering the internal air passages 34*b* and the internal air bypass 19*a*. In other words, no external air enters the internal air passages 34*b* or the internal air bypass 19*a*.

In Embodiment 1, the first guide 20 has a hollow tubular shape and is accommodated in the frame 16. In detail, the first guide 20 is attached to the plate member 37 of the frame 16 at positions radially inward from the end-face air holes 37*a* of the plate member 37, and to the stator core 34 at positions radially inward from the external air passages 34*a* and the internal air passages 34*b* of the stator core 34.

Figure 5:
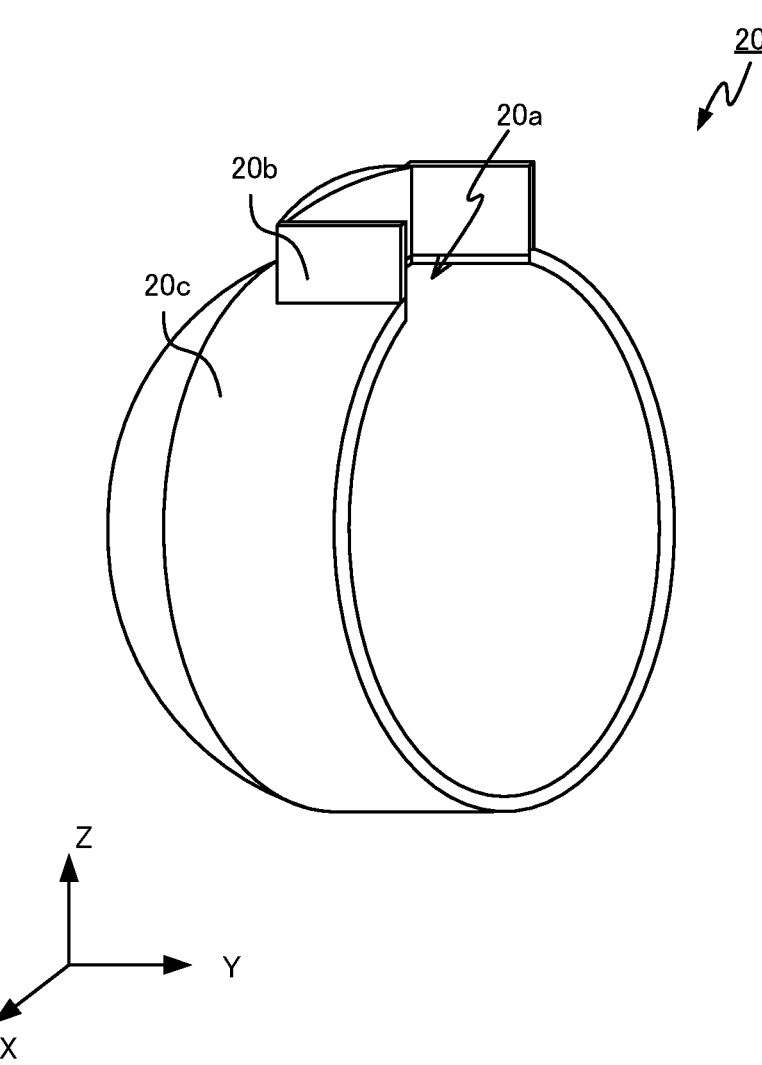
FIG. 5 is a perspective view of a first guide according to Embodiment 1.
Figure 6:
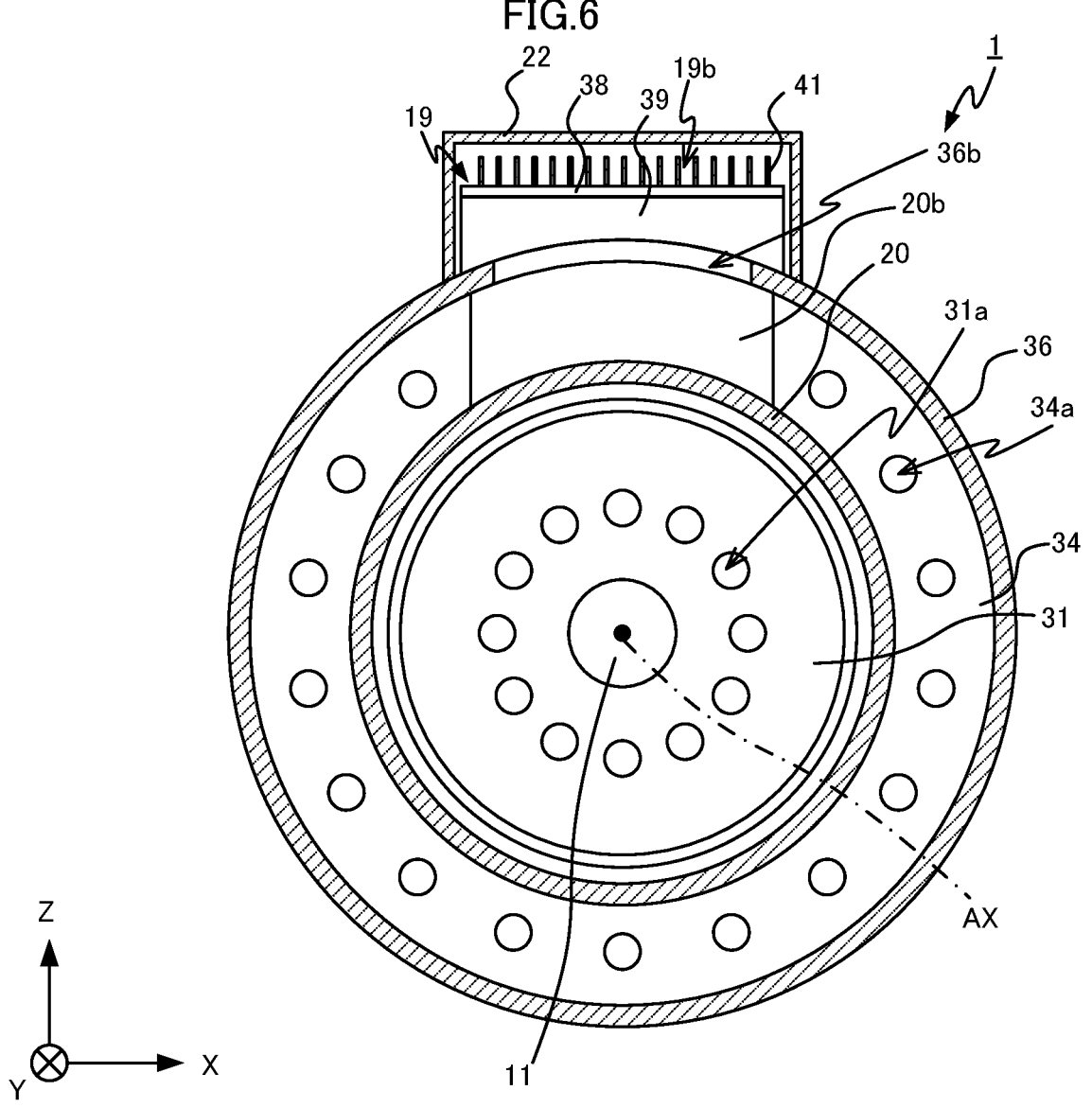
FIG. 6 is a cross-sectional view of the electric motor according to Embodiment 1 taken along the line VI-VI of FIG. 1.

As illustrated in FIG. 5, the first guide 20 has an outer peripheral surface 20*c* having a first opening 20*a*, which is a cutout portion. The outer peripheral surface 20*c* of the first guide 20 also has first partitions 20*b* extending from the periphery of the first opening 20*a* in a direction away from the outer peripheral surface 20*c*. In Embodiment 1, as illustrated in FIG. 1, the first opening 20*a* faces the second air hole 36*c*. The first partitions 20*b* extend from the outer peripheral surface 20*c* toward the tubular member 36. The first partitions 20*b* separate the first air hole 36*b* continuous to the external air bypass 19*b* and the second air hole 36*c* continuous to the internal air bypass 19*a*. As illustrated in FIGS. 1 and 2, the first partitions 20*b* also separate the external air passages 34*a* and the internal air passages 34*b*. In detail, as illustrated in FIG. 2 and FIG. 6, which is a cross-sectional view taken along the line VI-VI of FIG. 1, the first partitions 20*b* surround the space in communication with one ends of the internal air passages 34*b*, and thus separate the external air passages 34*a* from the internal air passages 34*b*.

As illustrated in FIG. 1, the second guide 21 is disposed between the second bracket 18 and the stator 13. The second guide 21 guides the external air after passing through the external air passages 34*a* to the external space via the outlet holes 36*a* of the frame 16, and guides the internal air to the internal air passages 34*b* and the internal air bypass 19*a*. The second guide 21 also prevents the external air from entering the internal air passages 34*b* and the internal air bypass 19*a*.

In Embodiment 1, the second guide 21 has a hollow tubular shape and is accommodated in the frame 16. In detail, the second guide 21 is attached to the stator core 34 at positions radially inward from the external air passages 34*a* and the internal air passages 34*b* of the stator core 34, and to the tubular member 36.

Figure 7:
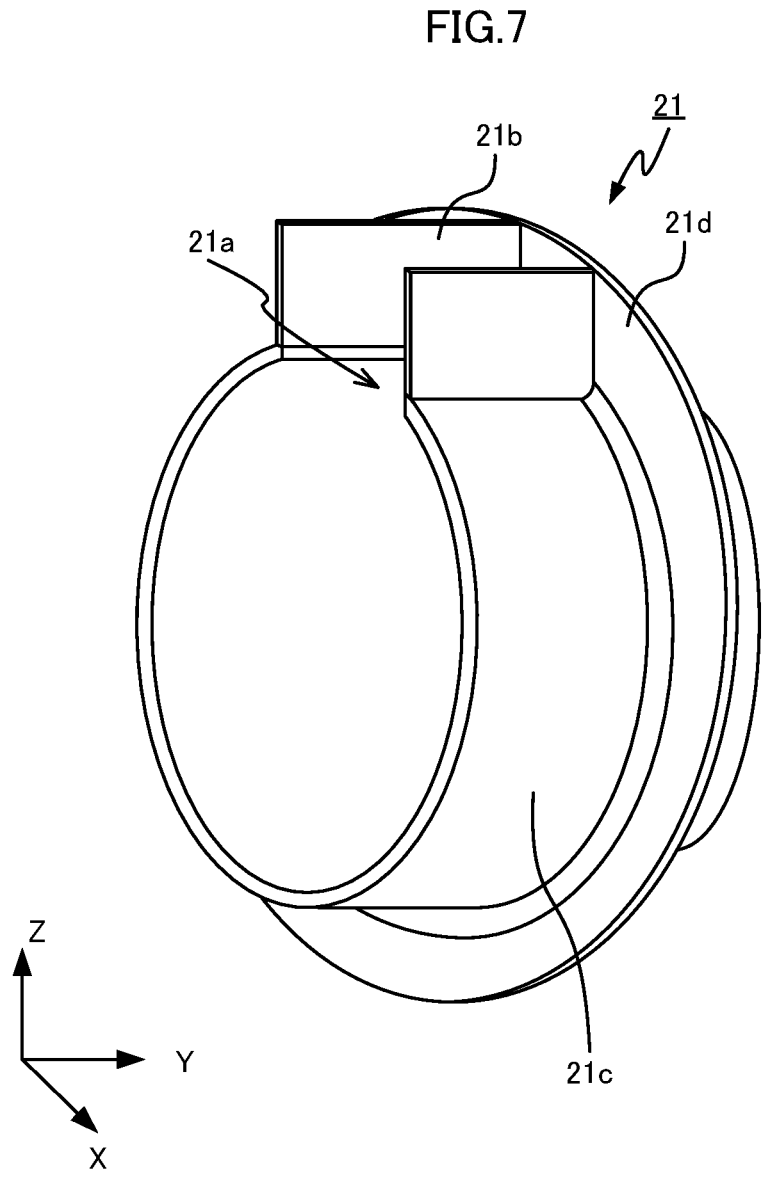
FIG. 7 is a perspective view of a second guide according to Embodiment 1.

As illustrated in FIG. 7, the second guide 21 has an outer peripheral surface 21*c* provided with an annular joint 21*d*. As illustrated in FIG. 1, the joint 21*d* is attached to the inner peripheral surface of the frame 16. As illustrated in FIG. 7, the outer peripheral surface 21*c* of the second guide 21 has a second opening 21*a*, which is a cutout portion. The outer peripheral surface 21*c* of the second guide 21 also has second partitions 21*b*, which are a pair of plate members extending from the periphery of the second opening 21*a* in a direction away from the outer peripheral surface 21*c* and abutting on the joint 21*d*. In Embodiment 1, as illustrated in FIG. 1, the second opening 21*a* faces the third air hole 36*d*. The second partitions 21*b* are a pair of plate members extending from the outer peripheral surface 21*c* toward the tubular member 36 and abutting on the joint 21*d*. As illustrated in FIG. 3, the second partitions 21*b* separate the external air passages 34*a* and the internal air passages 34*b*.

As illustrated in FIG. 1, the cover 22 is disposed over at least parts of the outer fins 41 encompassing the respective ends of the outer fins 41 closer to the first guide 20. The cover 22 disposed over at least parts of the outer fins 41 encompassing the respective ends closer to the first guide 20 guides the external air after passing through the first air hole 36*b* to the external air bypass 19*b*.

The outer-facing fan 23 is attached to the shaft 11 at a position between the first bracket 17 and the stator 13, and is rotatable integrally with the shaft 11.

The inner-facing fan 24 is attached to the shaft 11 at a position between the second bracket 18 and the stator 13 such that the circumferential edge of the inner-facing fan 24 is adjacent to the second guide 21, and is rotatable integrally with the shaft 11. The circumferential edge of the inner-facing fan 24 and the second guide 21 preferably define a labyrinth channel therebetween. The labyrinth channel defined between the circumferential edge of the inner-facing fan 24 and the second guide 21 can prevent contaminants, such as dust and water drops, from adhering to the rotor conductors 32 and the stator conductors 35.

The lead wire 51 extends through the through hole of the heat transfer member 38, the third air hole 36*d*, and the second opening 21*a* to the internal space of the electric motor 1, and is connected to the stator conductors 35.

Figure 8:
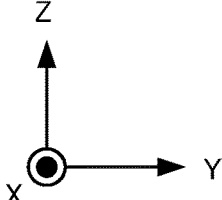
FIG. 8 illustrates flows of the external air and the internal air in the electric motor according to Embodiment 1.

The following description is directed to flows of the external air and the internal air during energization of the electric motor 1 having the above-described structure, with reference to FIG. 8. When an electric current is fed via the lead wire 51 to the stator conductors 35 to energize the electric motor 1, the rotor 12 rotates, so that the shaft 11, the outer-facing fan 23, and the inner-facing fan 24 rotate integrally with the rotor 12.

The rotation of the outer-facing fan 23 induces flows of the external air, as represented with the solid-line arrows ART and AR2 in FIG. 8.

In detail, in accordance with the rotation of the outer-facing fan 23, the external air is drawn in via the inlet holes 17*a* of the first bracket 17. The external air drawn in via the inlet holes 17*a* flows radially, and reaches the end-face air holes 37*a*.

A part of the external air after passing through the end-face air holes 37*a* flows along the first guide 20 toward the first air hole 36*b*, flows through the first air hole 36*b*, and then enters the external air bypass 19*b*. The external air entering the external air bypass 19*b* is guided by the cover 22 in the Y-axis direction, and flows in the external air bypass 19*b*. The external air bypass 19*b* is exposed to the external space, and the external air flowing in the external air bypass 19*b* is thus discharged to the external space. In other words, the structure generates a flow of the external air drawn in via the inlet holes 17*a*, flowing in the external air bypass 19*b*, and then being discharged, as represented with the arrow AR1.

Another part of the external air after passing through the end-face air holes 37a flows along the first guide 20 toward the external air passages 34a, and enters the external air passages 34a. The external air after passing through the external air passages 34a flows along the second guide 21, and is discharged to the external space via the outlet holes 36a. In other words, the structure generates a flow of the external air drawn in via the inlet holes 17a, flowing in the external air passages 34a, and then being discharged, as represented with the arrow AR2. The flow of the external air as represented with the arrow AR2 cools the stator 13.

The rotation of the inner-facing fan 24 induces flows of the internal air, as represented with the broken-line arrows AR3, AR4, and AR5 in FIG. 8.

In detail, in accordance with the rotation of the inner-facing fan 24, the internal air between the second guide 21 and the rotor 12 or the stator 13 flows radially. The internal air radially flowing flows along the second guide 21 toward the second opening 21a.

A part of the internal air after passing through the second opening 21a enters the internal air passages 34b. The air after passing through the internal air passages 34b flows through the first opening 20a and proceeds toward the through holes 33a in communication with the rotor air passages 31a.

Another part of the internal air after passing through the second opening 21a flows through the third air hole 36d and enters the internal air bypass 19a. The internal air after passing through the internal air bypass 19a flows through the second air hole 36c and the first opening 20a, and proceeds toward the through holes 33a in communication with the rotor air passages 31a. The internal air after passing through the first opening 20a flows to not only the through holes 33a in the vertically upper portion but also the through holes 33a in the vertically lower portion.

The internal air after passing through the through holes 33a in one of the pair of holding members 33, the rotor air passages 31a, and the through holes 33a in the other of the pair of holding members 33 in sequence flows radially in accordance with rotation of the inner-facing fan 24. The above-described circulation of the internal air, as represented with the arrows AR3, AR4, and AR5, cools the rotor 12 and the stator 13.

The heat transfer member 38 of the heat exchanger 19 transfers heat from the internal air flowing in the internal air bypass 19a as represented with the arrow AR4 to the external air flowing in the external air bypass 19b as represented with the arrow ART. The temperature of the internal air exiting the internal air bypass 19a is therefore lower than the temperature of the internal air entering the internal air bypass 19a. The internal air having a lower temperature can achieve improved efficiency of cooling the rotor 12 and the stator 13.

As described above, the electric motor 1 according to Embodiment 1 includes the heat exchanger 19 to transfer heat from the internal air flowing in the internal air bypass 19a to the external air flowing in the external air bypass 19b. The heat exchanger 19 can lower the temperature of the internal air, and can thus improve the cooling efficiency of the electric motor 1. The electric motor 1 has higher cooling efficiency than an electric motor of a totally enclosed type that includes no heat exchanger 19, and can thus achieve a smaller radial size of the frame 16. The heat exchanger 19 has a simple structure including the internal air bypass 19a defined between the heat transfer member 38 and the outer periphery of the frame 16 and the external air bypass 19b disposed on a radially outside of the heat transfer member

38. The electric motor 1 thus has a simpler structure than an electric motor including a heat exchanging device installed at a position apart from the stator and provided with fins across the entire outer peripheral surface, and can therefore achieve a smaller radial size. In other words, the electric motor 1 is a compact electric motor having high cooling efficiency.

Embodiment 2

Although the electric motor 1 according to Embodiment 1 includes a single heat exchanger 19 in the vertically upper portion, the electric motor may include multiple heat exchangers. The description of Embodiment 2 is directed to an electric motor 2 including multiple heat exchangers.

Figure 9:
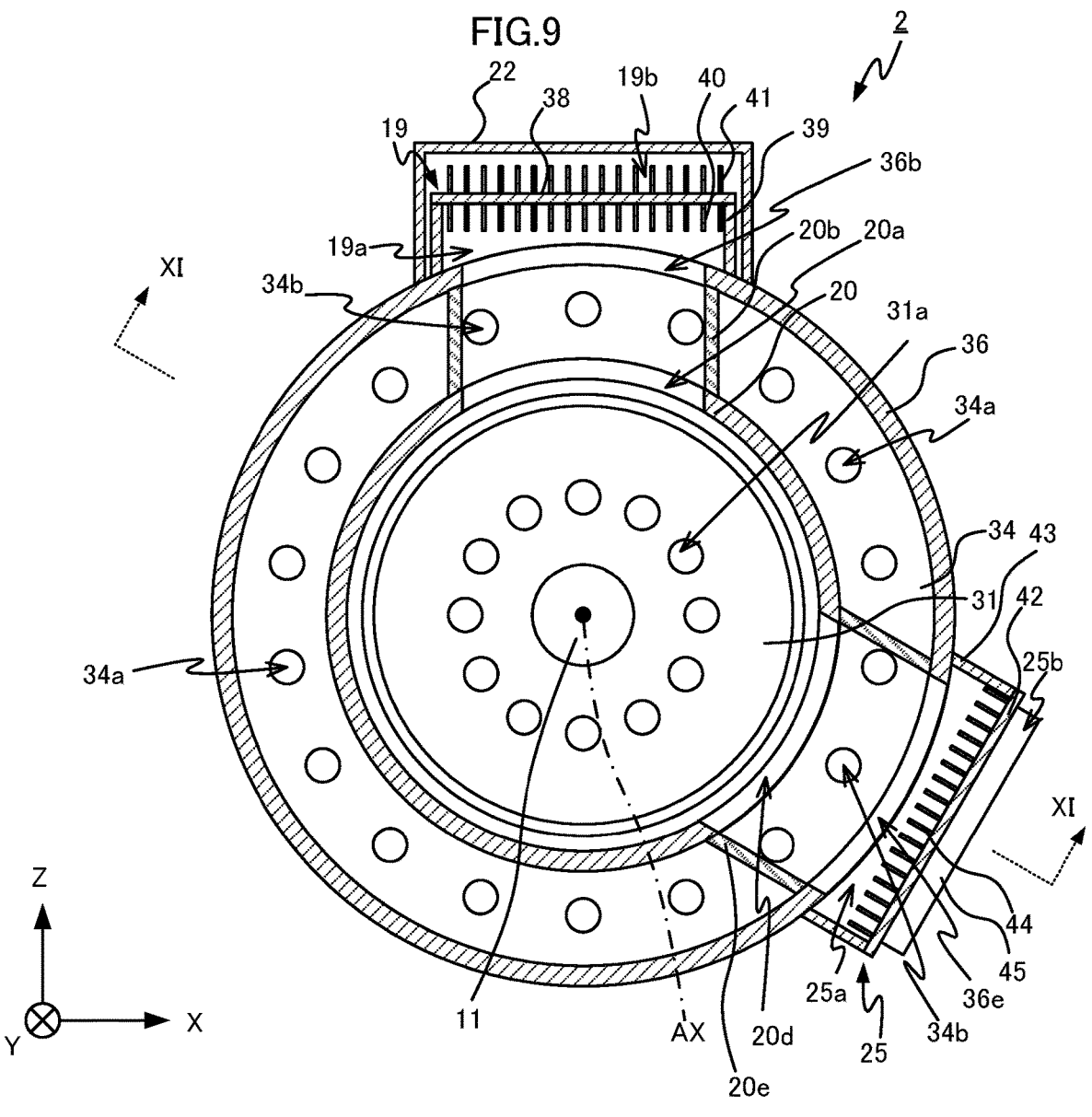
FIG. 9 is a cross-sectional view of an electric motor according to Embodiment 2.

The electric motor 2 has the same section in a YZ plane as that illustrated in FIG. 1. As illustrated in FIG. 9, which is a view of the electric motor 2 in the same section as FIG. 2, and FIG. 10, which is a view of the electric motor 2 in the same section as FIG. 3, the electric motor 2 further includes a heat exchanger 25 in addition to the components of the electric motor 1 according to Embodiment 1. In detail, the electric motor 2 includes the heat exchanger 19 in the vertically upper portion, and a heat exchanger 25 in a portion of the tubular member 36 intersecting the X axis, which includes an internal air bypass 25a and an external air bypass 25b.

In the heat exchanger 25, heat is transferred from the internal air flowing in the internal air bypass 25a to the external air flowing in the external air bypass 25b, resulting in a decrease in temperature of the internal air, as in the heat exchanger 19. This mechanism can improve the cooling efficiency of the electric motor 2. The heat exchanger 25 has such a simple structure that the heat exchanger 25 defines the internal air bypass 25a with the frame 16 and has the external air bypass 25b on the outer peripheral surface, like the heat exchanger 19. The electric motor 2 is thus a compact electric motor having high cooling efficiency.

The components of the electric motor 2 are described in detail below focusing on the differences from the electric motor 1 according to Embodiment 1. The vertically upper portion of the stator core 34 and the portion of the stator core 34 facing a positive side in the X-axis direction have internal air passages 34b, and the portions of the stator core 34 provided with no internal air passages 34b have external air passages 34a.

Figure 11:
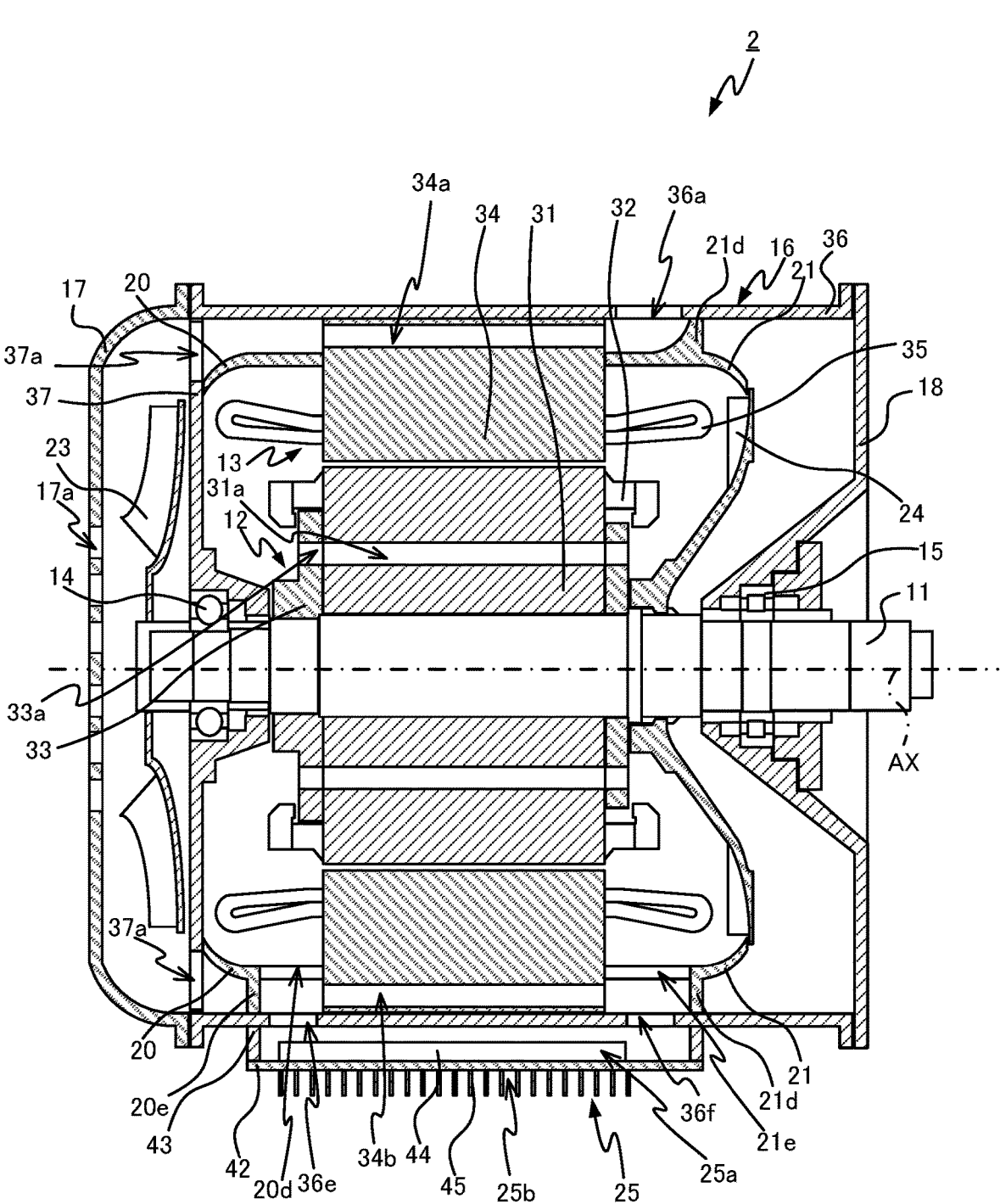
FIG. 11 is a cross-sectional view of the electric motor according to Embodiment 2 taken along the line XI-XI of FIG. 9.

As illustrated in FIG. 11, which is a cross-sectional view taken along the line XI-XI of FIG. 9, the portion of the tubular member 36 facing the positive side in the X-axis direction has a second air hole 36e and a third air hole 36f continuous to the internal air bypass 25a.

The first guide 20 is disposed between the first bracket 17 and the stator 13. The first guide 20 guides the external air drawn in via the inlet holes 17a to the external air passages 34a and to the external air bypass 19b, and prevents the external air from entering the internal air passages 34b and the internal air bypasses 19a and 25a. In other words, no external air enters the internal air passages 34b or the internal air bypass 19a or 25a.

Figure 12:
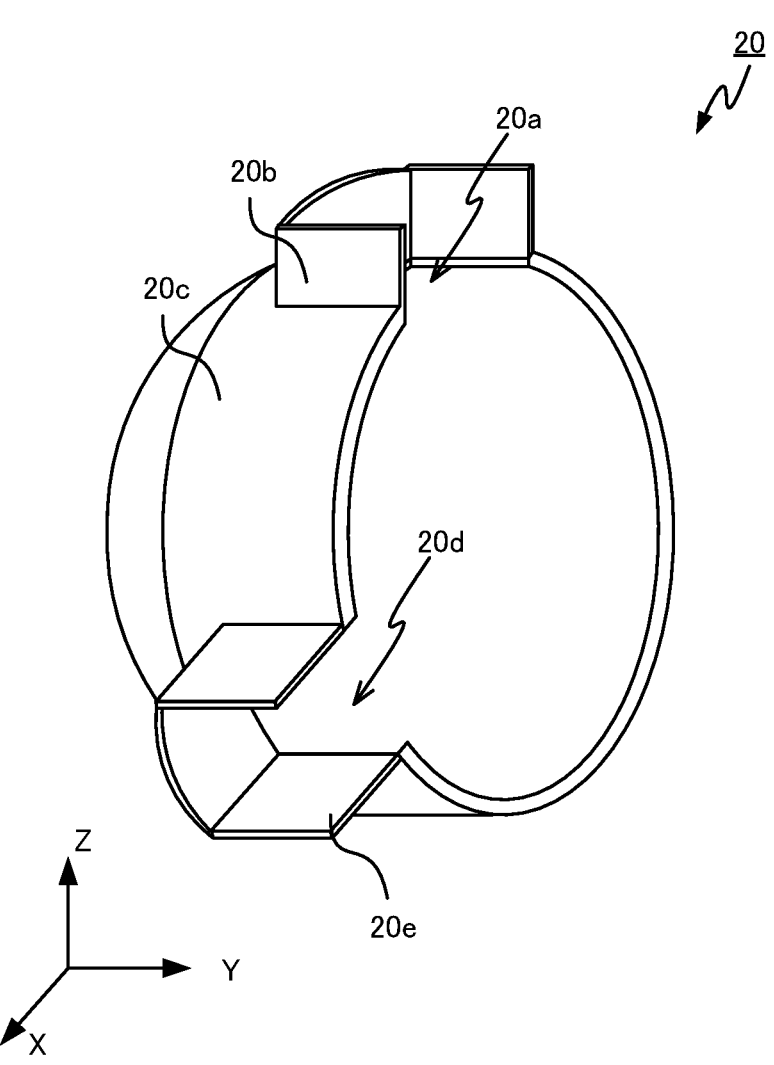
FIG. 12 is a perspective view of a first guide according to Embodiment 2.

As illustrated in FIG. 12, the first guide 20 of the electric motor 2 according to Embodiment 2 is configured by adding a first opening 20d and first partitions 20e to the first guide 20 of the electric motor 1 according to Embodiment 1. In detail, the outer peripheral surface 20c of the first guide 20 has the first opening 20d having the same shape as the first opening 20a. The outer peripheral surface 20c of the first guide 20 also has the first partitions 20e extending from the periphery of the first opening 20d in a direction away from the outer peripheral surface 20c. In Embodiment 2, as illustrated in FIG. 11, the first opening 20d faces the second air hole 36e. The first partitions 20e extend from the outer peripheral surface 20c toward the tubular member 36. As illustrated in FIG. 9, the first partitions 20e separate the external air passages 34a and the internal air passages 34b.

As illustrated in FIG. 11, the second guide 21 is disposed between the second bracket 18 and the stator 13. The second guide 21 guides the external air after passing through the external air passages 34a to the external space via the outlet holes 36a of the frame 16, and guides the internal air to the internal air passages 34b and the internal air bypass 19a. The second guide 21 also prevents the external air from entering the internal air passages 34b and the internal air bypass 19a.

Figure 10:
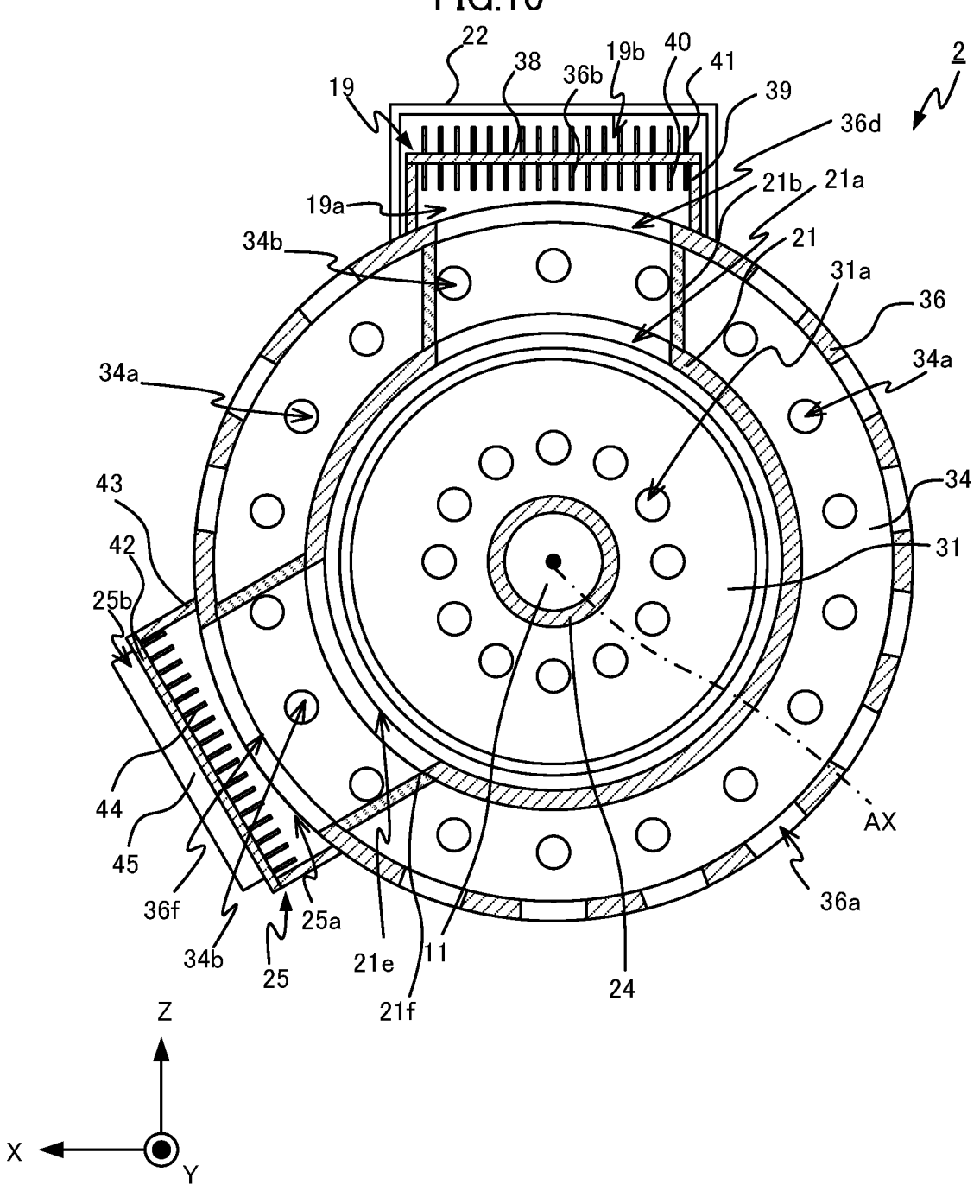
FIG. 10 is another cross-sectional view of the electric motor according to Embodiment 2.
Figure 13:
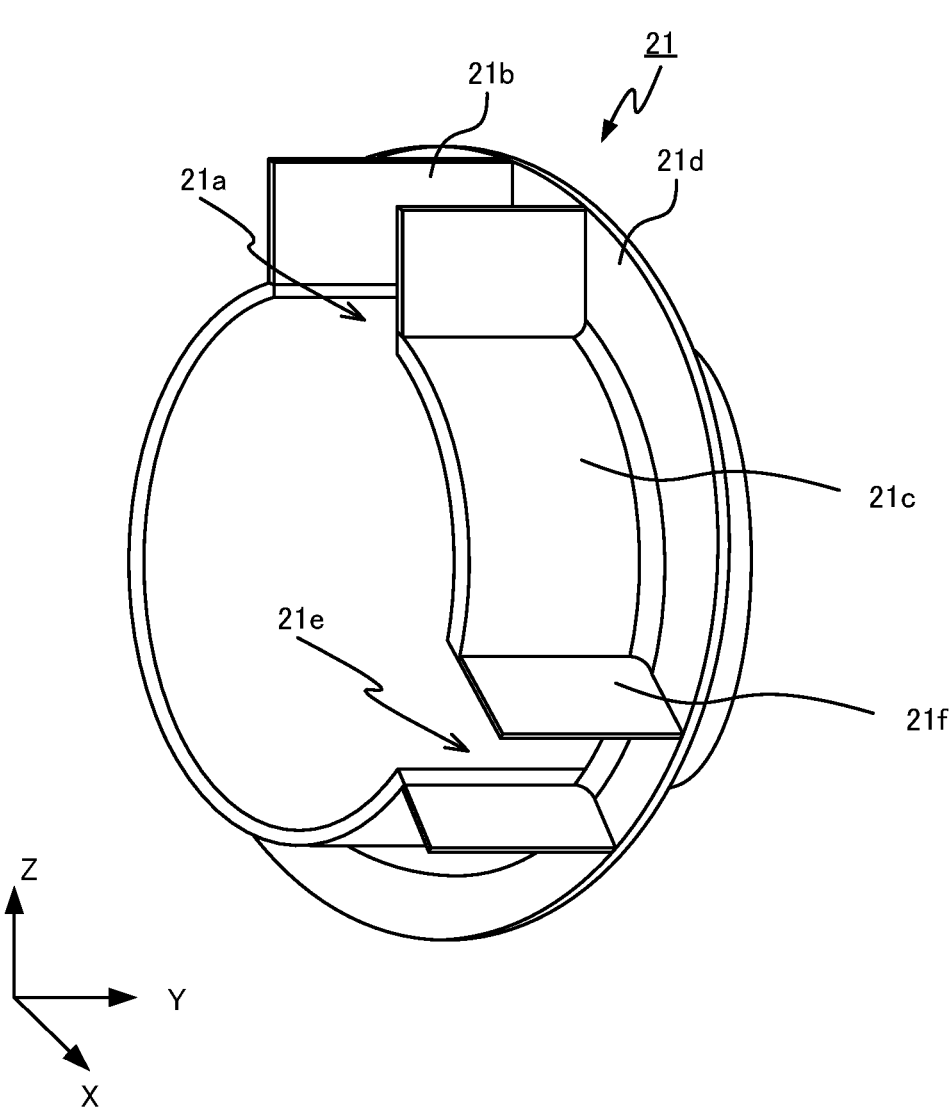
FIG. 13 is a perspective view of a second guide according to Embodiment 2.

As illustrated in FIG. 13, the second guide 21 of the electric motor 2 according to Embodiment 2 is configured by adding a second opening 21e and second partitions 21f to the second guide 21 of the electric motor 1 according to Embodiment 1. In detail, the outer peripheral surface 21c of the second guide 21 has the second opening 21e having the same shape as the second opening 21a. The outer peripheral surface 21c of the second guide 21 also has the second partitions 21f, which are a pair of plate members extending from the periphery of the second opening 21e in a direction away from the outer peripheral surface 21c and abutting on the joint 21d. In Embodiment 2, as illustrated in FIG. 11, the second opening 21e faces the third air hole 36f. As illustrated in FIG. 10, the second partitions 21f separate the external air passages 34a and the internal air passages 34b.

As illustrated in FIGS. 9 and 10, the heat exchanger 25 includes the internal air bypass 25a located radially outward from the internal air passages 34b located in the vertically lower portion, the external air bypass 25b located radially outward from the internal air bypass 25a and continuous to the external space, and a heat transfer member 42 to separate the internal air bypass 25a and the external air bypass 25b. The heat transfer member 42 is mounted on a fitting member 43 fixed on the outer peripheral surface of the tubular member 36. The fitting member 43 has a hollow tubular shape having a rectangular section, and is fixed to the tubular member 36 in such an orientation that the central axis intersects the outer peripheral surface of the tubular member 36. The space surrounded by the heat transfer member 42, the fitting member 43, and the tubular member 36 of the frame 16 defines the internal air bypass 25a.

The heat transfer member 42 is preferably a plate member made of a material having a high thermal conductivity, for example, a metal, such as copper or aluminum. The heat transfer member 42 made of a material having a high thermal conductivity facilitates heat to be transferred from the internal air flowing in the internal air bypass 25a to the external air flowing in the external air bypass 25b, resulting in a decrease in temperature of the internal air. This configuration can improve the cooling efficiency of the electric motor 2. In order to further improve the cooling efficiency of the electric motor 2, the heat transfer member 42 is preferably made of a thin plate having a thickness of at most one millimeter, for example. The heat transfer member 42 made of a thin plate facilitates heat to be efficiently transferred from the internal air flowing in the internal air bypass 25a to the external air flowing in the external air bypass 25b, resulting in a further decrease in temperature of the internal air. This configuration can further improve the cooling efficiency of the electric motor 2.

The heat exchanger 25 further includes multiple inner fins 44 disposed with spaces therebetween on a surface of the heat transfer member 42 within the internal air bypass 25a, and multiple outer fins 45 disposed with spaces therebetween on the surface of the heat transfer member 42 opposite to the surface provided with the inner fins 44. The inner fins 44 have the main surfaces extending in the Y axis. The outer fins 45 have the main surfaces existing in planes intersecting the rotation axis AX. In detail, the main surfaces of the outer fins 45 are parallel to a plane orthogonal to the rotation axis AX, specifically, parallel to the XZ plane. The air gaps between the outer fins 45 define the external air bypass 25b. Because of the main surfaces of the outer fins 45 parallel to the XZ plane, traveling winds generated during running of the railway vehicle flow through the air gaps between the outer fins 45, that is, through the external air bypass 25b. Since traveling winds flow through the external air bypass 25b, the external air drawn in via the inlet holes 17a is not required to be fed to the external air bypass 25b.

Figure 14:
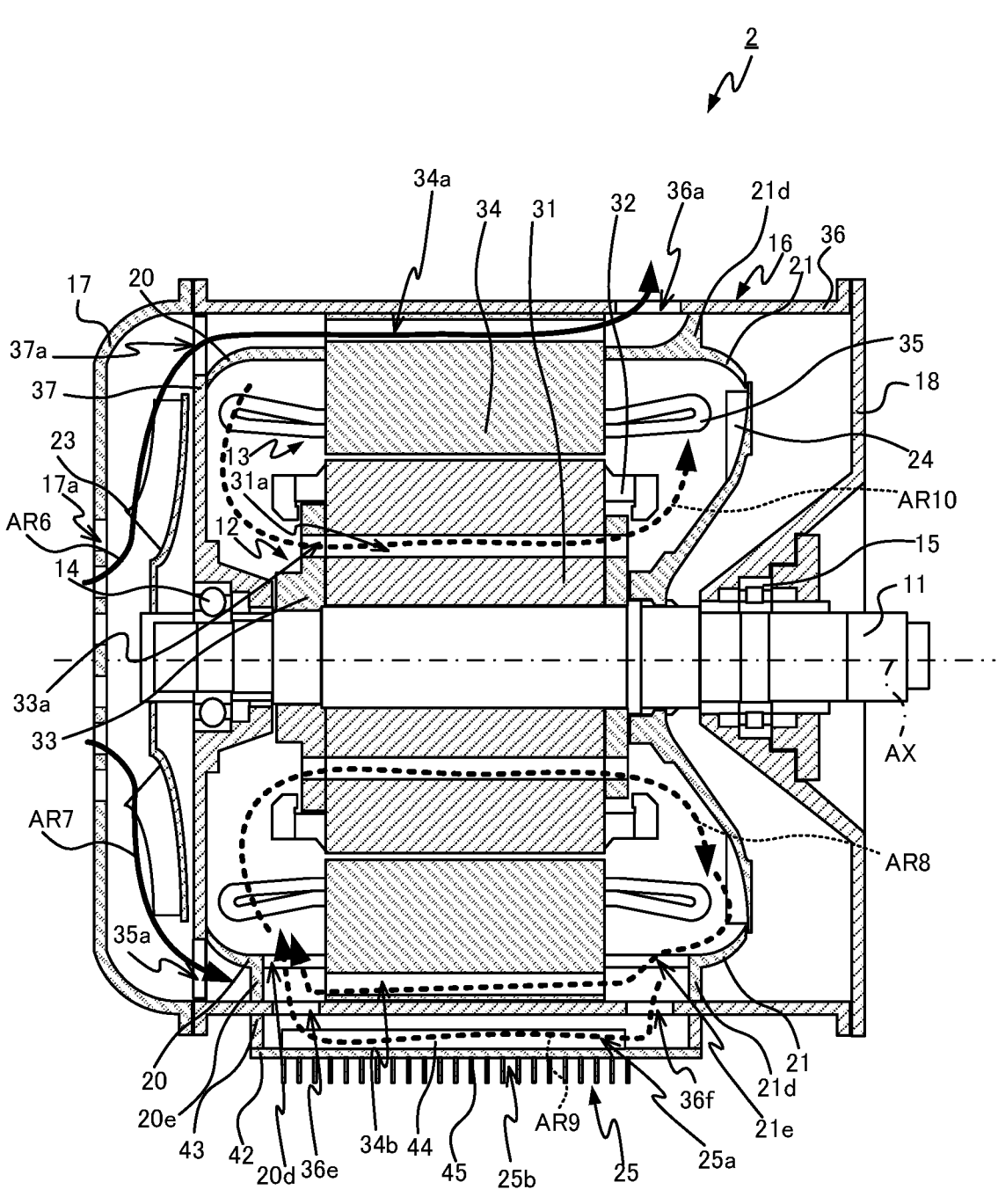
FIG. 14 illustrates flows of the external air and the internal air in the electric motor according to Embodiment 2.

The following description is directed to flows of the external air and the internal air during energization of the electric motor 2 having the above-described structure. The flows of air in the YZ plane are the same as those in the electric motor 1 illustrated in FIG. 8. FIG. 14 illustrates flows of the external air and the internal air in a section intersecting the heat exchanger 25. When an electric current is fed via the lead wire 51 to the stator conductors 35 to energize the electric motor 2, the rotor 12 rotates, so that the shaft 11, the outer-facing fan 23, and the inner-facing fan 24 rotate integrally with the rotor 12.

The rotation of the outer-facing fan 23 induces flows of the external air, as represented with the solid-line arrows AR6 and AR7 in FIG. 14.

In detail, in accordance with the rotation of the outer-facing fan 23, the external air is drawn in via the inlet holes 17a of the first bracket 17. The external air drawn in via the inlet holes 17a flows radially, and reaches the end-face air holes 37a.

The external air after passing through the end-face air holes 37a, flows along the first guide 20 toward the external air passages 34a, and enters the external air passages 34a. The external air after passing through the external air passages 34a flows along the second guide 21, and is discharged to the external space via the outlet holes 36a. In other words, the structure generates flows of the external air drawn in via the inlet holes 17a, flowing in the external air passages 34a, and then being discharged, as represented with the arrows AR6 and AR7. The flows of the external air as represented with the arrows AR6 and AR7 cool the stator 13.

The rotation of the inner-facing fan 24 induces flows of the internal air, as represented with the broken-line arrows AR8, AR9, and AR10 in FIG. 14.

In detail, in accordance with the rotation of the inner-facing fan 24, the internal air between the second guide 21 and the rotor 12 or the stator 13 flows radially. A part of the internal air radially flowing flows along the second guide 21 toward the second opening 21a, as in Embodiment 1. Another part of the internal air radially flowing flows along the second guide 21 toward the second opening 21e.

The part of the internal air after passing through the second opening 21a flows like that in Embodiment 1. The following description is directed to flows of the internal air after passing through the second opening 21e.

A part of the internal air after passing through the second opening 21e enters the internal air passages 34b. The air after passing through the internal air passages 34b flows through the first opening 20*d*, and proceeds toward the through holes 33*a* in communication with the rotor air passages 31*a*.

Another part of the internal air after passing through the second opening 21*e* flows through the third air hole 36*f*, and enters the internal air bypass 25*a*. The internal air after passing through the internal air bypass 25*a* flows through the second air hole 36*e*, and proceeds toward the through holes 33*a* in communication with the rotor air passages 31*a* The internal air after passing through the first opening 20*d* flows to not only the through holes 33*a* in the vertically lower portion but also the through holes 33*a* in the vertically upper portion.

The internal air after passing through the through holes 33*a* in one of the pair of holding members 33, the rotor air passages 31*a*, and the through holes 33*a* in the other of the pair of holding members 33 in sequence flows radially in accordance with rotation of the inner-facing fan 24. The above-described circulation of the internal air, as represented with the arrows AR8, AR9, and AR10, cools the rotor 12 and the stator 13.

The heat transfer member 42 of the heat exchanger 25 transfers heat from the internal air flowing in the internal air bypass 25*a* as represented with the arrow AR9 to the external air flowing in the external air bypass 25*b*, that is, traveling winds. The temperature of the internal air exiting the internal air bypass 25*a* is therefore lower than the temperature of the internal air entering the internal air bypass 25*a*. The internal air having a lower temperature can achieve improved efficiency of cooling the rotor 12 and the stator 13.

As described above, the electric motor 2 according to Embodiment 2 includes the heat exchanger 19 to transfer heat from the internal air flowing in the internal air bypass 19*a* to the external air flowing in the external air bypass 19*b*, and the heat exchanger 25 to transfer heat from the internal air flowing in the internal air bypass 25*a* to the external air flowing in the external air bypass 25*b*. Since the heat exchangers 19 and 25 lower the temperature of the internal air, the electric motor 2 can achieve higher cooling efficiency than the electric motor 1.

Embodiment 3

Although the electric motors 1 and 2 according to Embodiments 1 and 2 include the frame 16, the electric motors 1 and 2 may also be frameless electric motors. The description of Embodiment 3 is directed to an electric motor 3 including no frame 16. The electric motor 3 illustrated in FIG. 15 lacks the frame 16, and includes a support member 46 attached to the inner peripheral surface of the first bracket 17 to support the bearing 14.

The components of the electric motor 3 are described in detail below, focusing on the differences from the electric motor 1 according to Embodiment 1. The first bracket 17 and the second bracket 18 are attached to the stator 13 with the stator 13 being located between the first bracket 17 and the second bracket 18 in the Y-axis direction. In detail, the first bracket 17 and the second bracket 18 are attached to the stator core 34 at positions on radially outsides of the external air passages 34*a* and the internal air passages 34*b* of the stator core 34.

Figure 15:
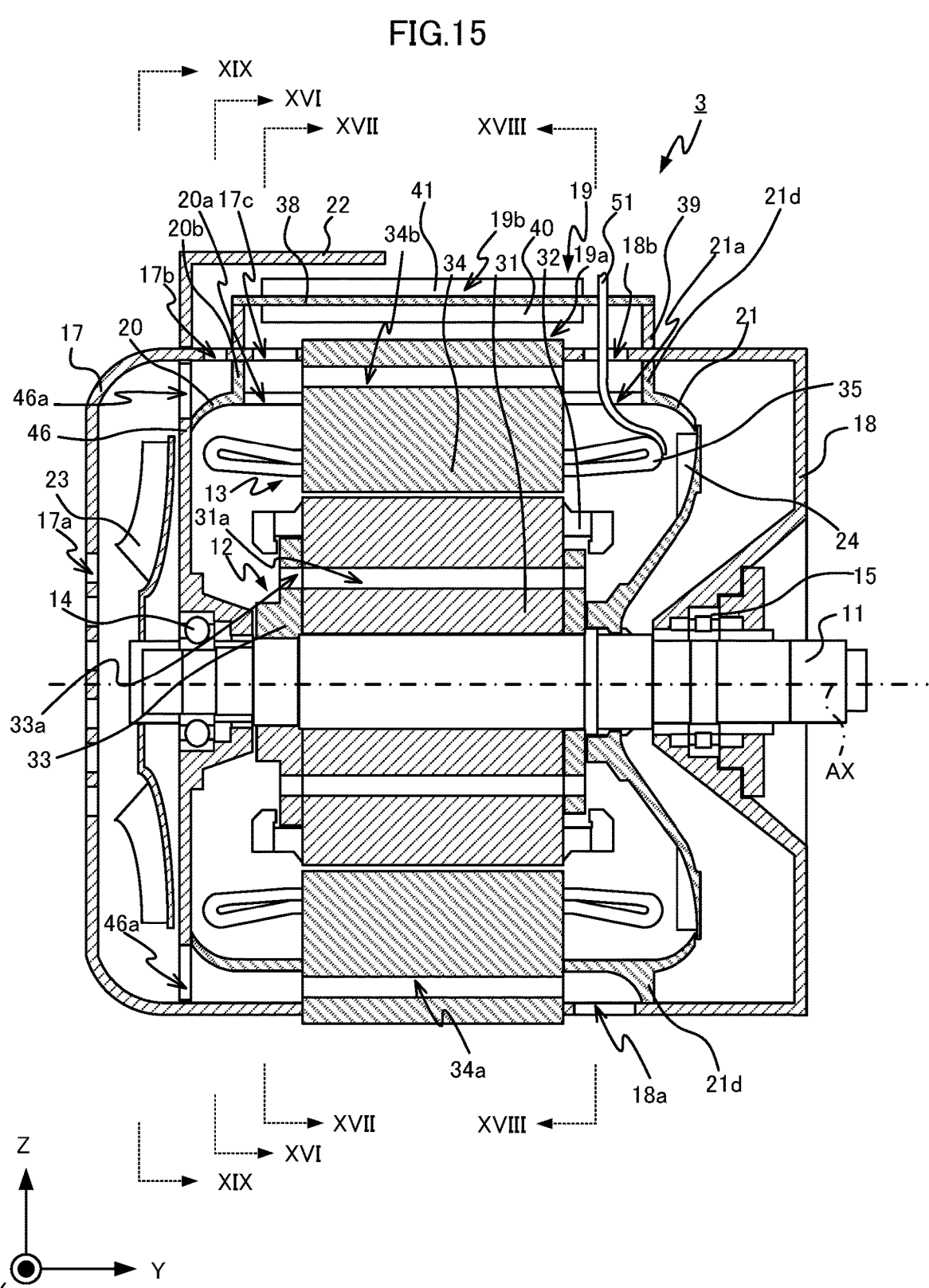
FIG. 15 is a cross-sectional view of an electric motor according to Embodiment 3.
Figure 16:
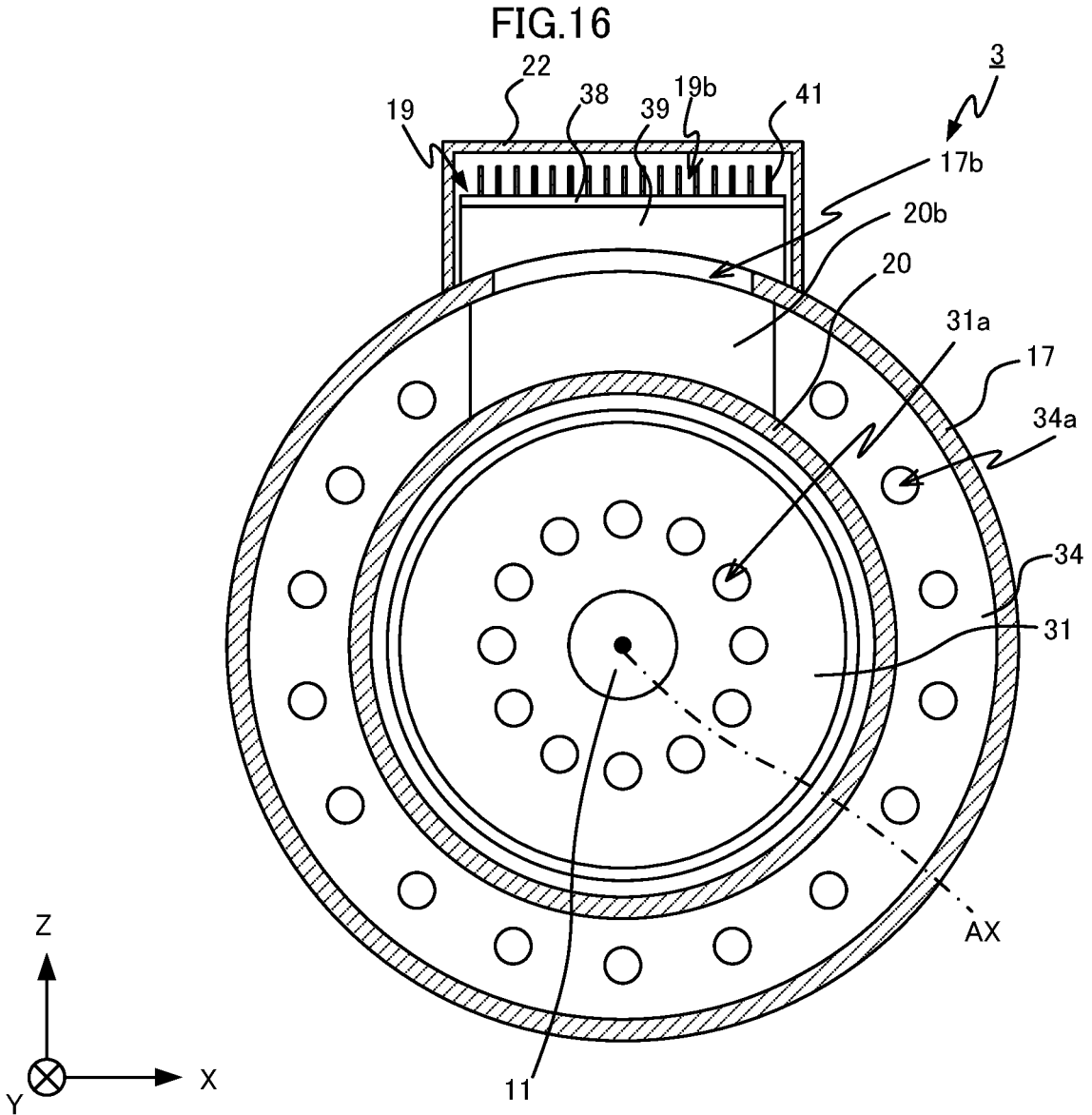
FIG. 16 is a cross-sectional view of the electric motor according to Embodiment 3 taken along the line XVI-XVI of FIG. 15.
Figure 17:
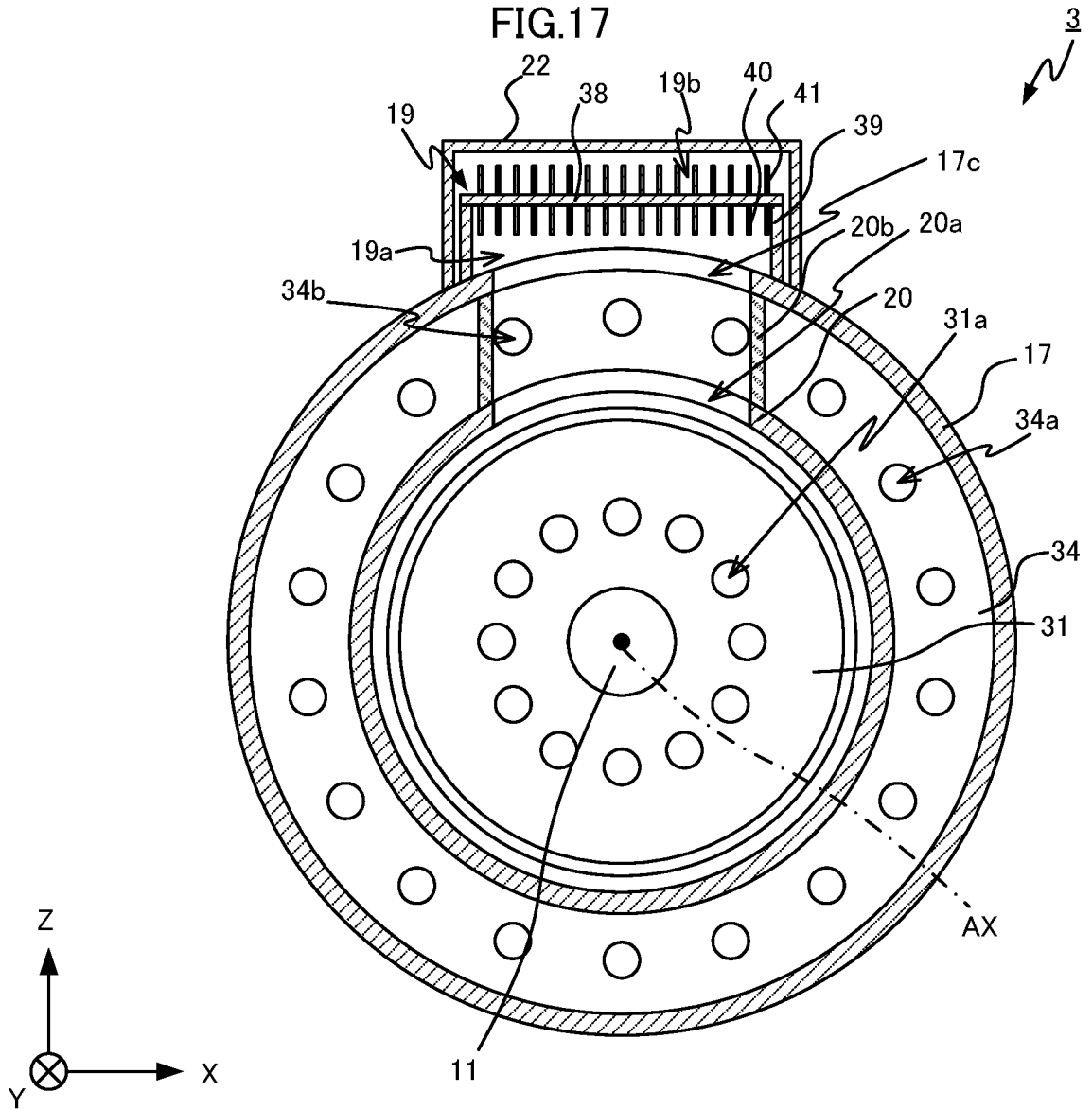
FIG. 17 is a cross-sectional view of the electric motor according to Embodiment 3 taken along the line XVII-XVII of FIG. 15.

As illustrated in FIG. 15, FIG. 16, which is a cross-sectional view taken along the line XVI-XVI of FIG. 15, and FIG. 17, which is a cross-sectional view taken along the line XVII-XVII of FIG. 15, the vertically upper portion of the first bracket 17 has a first air hole 17*b* continuous to the external air bypass 19*b* and a second air hole 17*c* continuous to the internal air bypass 19*a*.

Figure 18:
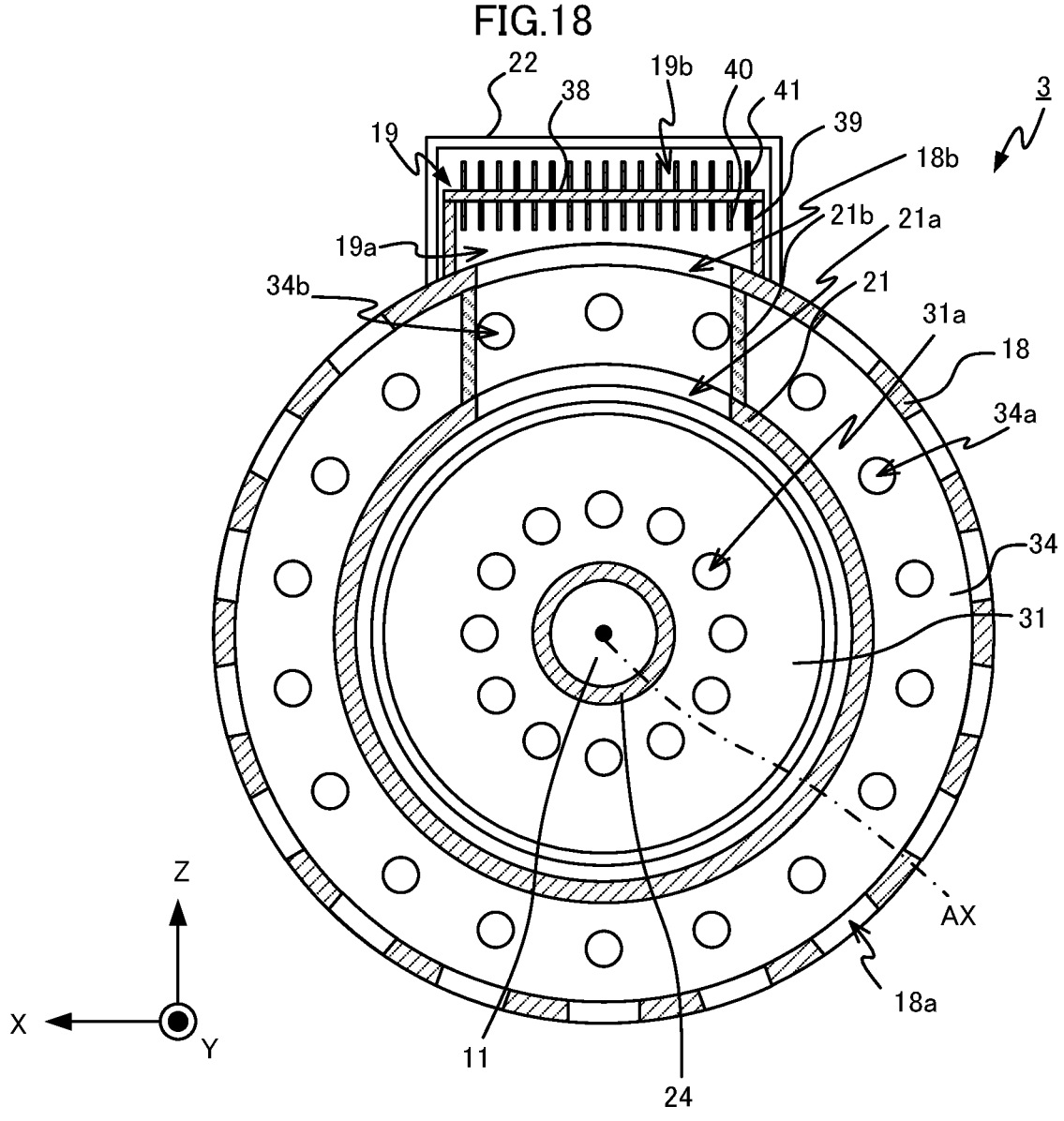
FIG. 18 is a cross-sectional view of the electric motor according to Embodiment 3 taken along the line XVIII-XVIII of FIG. 15.

The end of the second bracket 18 closer to the stator 13 has outlet holes 18*a* through which the external air after passing through the external air passages 34*a* is discharged to the external space. In Embodiment 3, as illustrated in FIG. 18, which is a cross-sectional view taken along the line XVIII-XVIII of FIG. 15, the outlet holes 18*a* are arranged in the circumferential direction in the portion other than the vertically upper portion of the second bracket 18. The outlet holes 18*a* radially extend through the second bracket 18. The vertically upper portion of the second bracket 18 has a third air hole 18*b* continuous to the internal air bypass 19*a*.

As illustrated in FIG. 15, the heat transfer member 38 of the heat exchanger 19 is mounted on the fitting member 39 fixed to the outer peripheral surfaces of the first bracket 17, the stator core 34, and the second bracket 18. The space surrounded by the heat transfer member 38, the fitting member 39, and the outer peripheral surfaces of the first bracket 17, the stator core 34, and the second bracket 18 defines the internal air bypass 19*a*.

The first partitions 20*b* of the first guide 20 extend from the periphery of the first opening 20*a* toward the inner peripheral surface of the first bracket 17. The first partitions 20*b* separate the first air hole 17*b* continuous to the external air bypass 19*b* and the second air hole 17*c* continuous to the internal air bypass 19*a*. As illustrated in FIG. 17, the first partitions 20*b* also separate the external air passages 34*a* and the internal air passages 34*b*. In detail, as illustrated in FIGS. 16 and 17, the first partitions 20*b* surround the space in communication with one ends of the internal air passages 34*b*, and thus separate the external air passages 34*a* and the internal air passages 34*b*.

As illustrated in FIGS. 15 and 18, the second partitions 21*b* of the second guide 21 are a pair of plate members extending from the periphery of the second opening 21*a* toward the inner peripheral surface of the second bracket 18 and abutting on the joint 21*d*. As illustrated in FIG. 18, the second partitions 21*b* separate the external air passages 34*a* and the internal air passages 34*b*.

Figure 19:
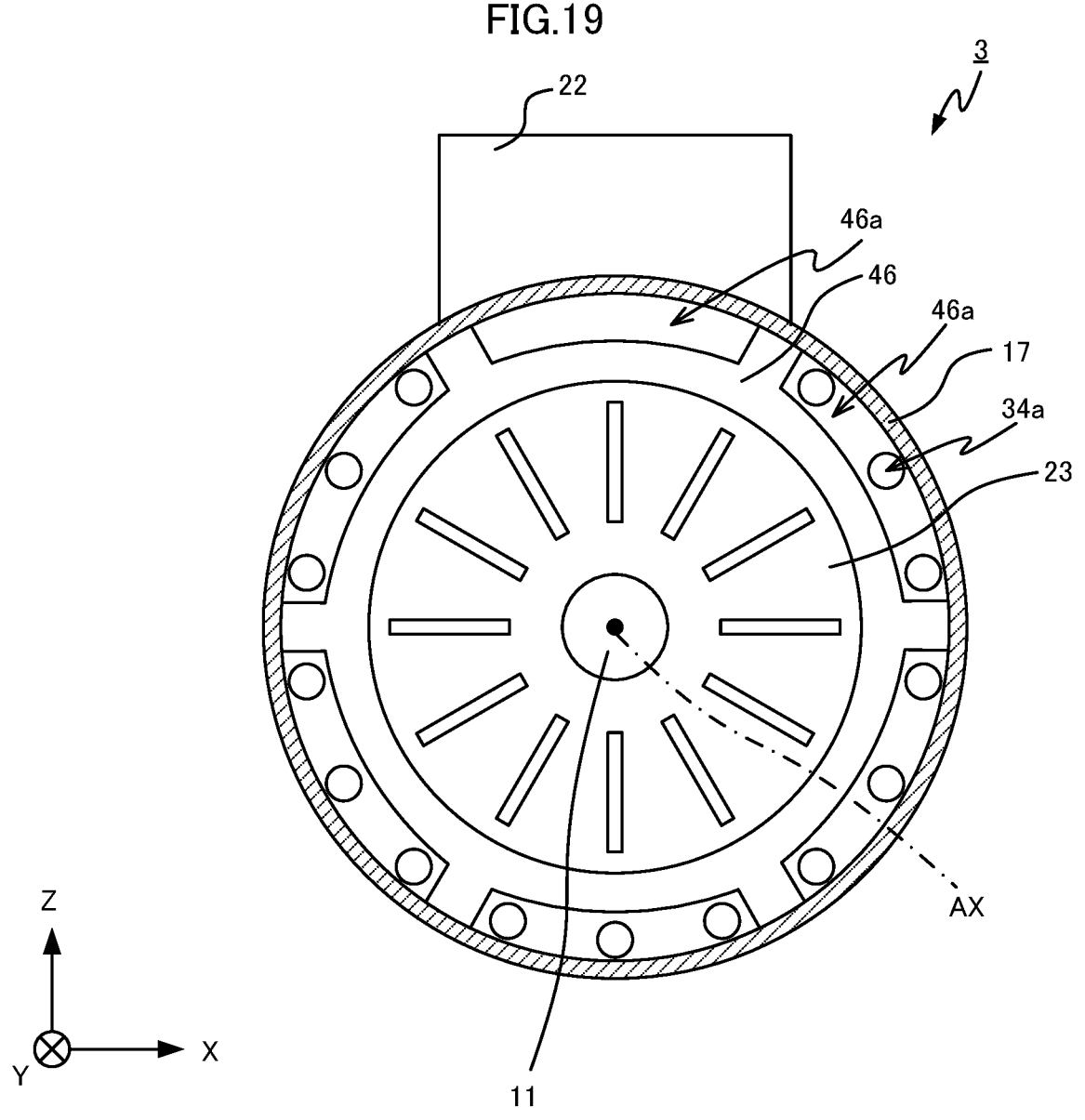
FIG. 19 is a cross-sectional view of the electric motor according to Embodiment 3 taken along the line XIX-XIX of FIG. 15.

As illustrated in FIG. 19, which is a cross-sectional view taken along the line XIX-XIX of FIG. 15, the support member 46 has end-face air holes 46*a* arranged in the circumferential direction. The end-face air holes 46*a* extend through the support member 46 in the Y-axis direction.

Figure 20:
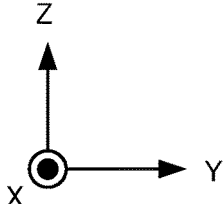
FIG. 20 illustrates flows of the external air and the internal air in the electric motor according to Embodiment 3.

The following description is directed to flows of the external air and the internal air during energization of the electric motor 3 having the above-described structure, with reference to FIG. 20. When an electric current is fed via the lead wire 51 to the stator conductors 35 to energize the electric motor 3, the rotor 12 rotates, so that the shaft 11, the outer-facing fan 23, and the inner-facing fan 24 rotate integrally with the rotor 12.

The rotation of the outer-facing fan 23 induces flows of the external air, as represented with the solid-line arrows AR11 and AR12 in FIG. 20.

In detail, in accordance with the rotation of the outer-facing fan 23, the external air is drawn in via the inlet holes 17*a* of the first bracket 17. The external air drawn in via the inlet holes 17*a* flows radially, and reaches the end-face air holes 46*a* of the support member 46.

A part of the external air after passing through the end-face air holes 46*a* flows along the first guide 20 toward the first air hole 17*b*, flows through the first air hole 17*b*, and enters the external air bypass 19*b*. The external air entering the external air bypass 19*b* is guided by the cover 22 in the Y-axis direction, and flows in the external air bypass 19*b*.

The external air bypass 19b is exposed to the external space, and the external air flowing in the external air bypass 19b is thus discharged to the external space. In other words, the structure generates a flow of the external air drawn in via the inlet holes 17a flowing in the external air bypass 19b, and then being discharged, as represented with the arrow AR11.

Another part of the external air after passing through the end-face air holes 46a flows along the first guide 20 toward the external air passages 34a, and enters the external air passages 34a. The external air after passing through the external air passages 34a flows along the second guide 21, and is discharged to the external space via the outlet holes 18a. In other words, the structure generates a flow of the external air drawn in via the inlet holes 17a, flowing in the external air passages 34a, and then being discharged, as represented with the arrow AR12. The flow of the external air, as represented with the arrow AR12, cools the stator 13.

The rotation of the inner-facing fan 24 induces flows of the internal air, as represented with the broken-line arrows AR13, AR14, and AR15 in FIG. 20.

In detail, in accordance with the rotation of the inner-facing fan 24, the internal air between the second guide 21 and the rotor 12 or the stator 13 flows radially. The internal air radially flowing flows along the second guide 21 toward the second opening 21a.

A part of the internal air after passing through the second opening 21a enters the internal air passages 34b. The air after passing through the internal air passages 34b flows through the first opening 20a and proceeds toward the through holes 33a in communication with the rotor air passages 31a.

Another part of the internal air after passing through the second opening 21a flows through the third air hole 18b and enters the internal air bypass 19a. The internal air after passing through the internal air bypass 19a flows through the second air hole 17c and the first opening 20a, and proceeds toward the through holes 33a in communication with the rotor air passages 31a The internal air after passing through the first opening 20a flows to not only the through holes 33a in the vertically upper portion but also the through holes 33a in the vertically lower portion.

The internal air after passing through the through holes 33a in one of the pair of holding members 33, the rotor air passages 31a, and the through holes 33a in the other of the pair of holding members 33 in sequence flows radially in accordance with rotation of the inner-facing fan 24. The above-described circulation of the internal air, as represented with the arrows AR13, AR14, and AR15, cools the rotor 12 and the stator 13.

The heat transfer member 38 of the heat exchanger 19 transfers heat from the internal air flowing in the internal air bypass 19a as represented with the arrow AR14 to the external air flowing in the external air bypass 19b as represented with the arrow AR11. The temperature of the internal air exiting the internal air bypass 19a is therefore lower than the temperature of the internal air entering the internal air bypass 19a. The internal air having a lower temperature can achieve improved efficiency of cooling the rotor 12 and the stator 13.

As described above, the electric motor 3 according to Embodiment 3 includes the heat exchanger 19 to transfer heat from the internal air flowing in the internal air bypass 19a to the external air flowing in the external air bypass 19b. The heat exchanger 19 can lower the temperature of the internal air, thereby improving the cooling efficiency of the electric motor 3. The heat exchanger 19 has a simple structure including the internal air bypass 19a defined between the heat transfer member 38 and the outer peripheral surfaces of the first bracket 17, the stator core 34, and the second bracket 18, and the external air bypass 19b disposed on a radially outside of the heat transfer member 38. The electric motor 3 thus has a simpler structure than an electric motor including a heat exchanging device installed at a position apart from the stator and provided with fins across the entire outer peripheral surface. The electric motor 3 is a frameless electric motor and can thus achieve a smaller radial size than the electric motors 1 and 2.

The above-described embodiments are not intended to limit the scope of the present disclosure.

The above-mentioned positions of the heat exchangers 19 and 25 are mere examples. The positions of the heat exchangers 19 and 25 are preferably determined depending on the limitation of the spaces around the electric motors 1 to 3, and the route of the lead wire 51, for example. The positions of the heat exchangers 19 and 25 determine the positions of the internal air passages 34b.

The first guide 20 may have any shape provided that the first guide 20 is able to guide the external air drawn in via the inlet holes 17a to the external air passages 34a and the external air bypass 19b and to prevent the external air from entering the internal air passages 34b and the internal air bypasses 19a and 25a. For example, the first guide 20 does not necessarily have a circular section and may have a polygonal section in a plane orthogonal to the Y-axis direction. For another example, the outer peripheral surface 20c of the first guide 20 may have a circular first opening 20a, and a tubular first partition 20b surrounding the first opening 20a and extending toward the tubular member 36. In this case, the first partition 20b preferably has a through hole for guiding the internal air after passing through the internal air passages 34b to the space between the first guide 20 and the stator 13.

The second guide 21 may have any shape provided that the second guide 21 is able to guide the external air after passing through the external air passages 34a to the external space, to guide the internal air to the internal air passages 34b and the internal air bypasses 19a and 25a, and to prevent the external air from entering the internal air passages 34b and the internal air bypasses 19a and 25a. For example, the second guide 21 does not necessarily have a circular section and may have a polygonal section in a plane orthogonal to the Y-axis direction.

The functions of the outer-facing fan 23 and the inner-facing fan 24 may be performed by a single fan having blades on both main surfaces. In this case, the first bracket 17 preferably supports the bearing 14, and the circumferential edge of the fan for performing the functions of the outer-facing fan 23 and the inner-facing fan 24 is preferably adjacent to the first guide 20 to define a labyrinth channel with the first guide 20.

The outer-facing fan 23 may be excluded when the external air can be drawn in via the inlet holes 17a with an additional blower, for example.

The above-mentioned number of external air passages 34a and number of internal air passages 34b are mere examples and may be any number.

The external air passages 34a and the internal air passages 34b do not necessarily have a circular section. For example, the external air passages 34a and the internal air passages 34b may have an elliptic section.

The external air passages 34a and the internal air passages 34b may extend in the direction parallel to the rotation axis AX or a direction intersecting the rotation axis AX.

The end-face air holes 37a and 46a do not necessarily have a circular section. For example, the end-face air holes 37a and 46a may have an elliptic section. The heat transfer member 38, the inner fins 40, and the outer fins 41 may be formed integrally with each other. Also, the heat transfer member 42, the inner fins 44, and the outer fins 45 may be formed integrally with each other.

The heat transfer member 38 and the fitting member 39 may be formed integrally with each other. Also, the heat transfer member 42 and the fitting member 43 may be formed integrally with each other.

The fitting member 39 may be formed integrally with the tubular member 36.

The inner fins 40 and 44 may be provided to the tubular member 36 of the frame 16.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to betaken in a limiting sense, and the scope of the invention is defined only by the included claims, along with the full range of equivalents to which such claims are entitled.

REFERENCE SIGNS LIST

1, 2, 3 Electric motor
11 Shaft
12 Rotor
13 Stator
14, 15 Bearing
16 Frame
17 First bracket
17a Inlet hole
17b, 36b First air hole
17c, 36c, 36e Second air hole
18 Second bracket
18a, 36a Outlet hole
18b, 36d, 36f Third air hole
19, 25 Heat exchanger
19a, 25a Internal air bypass
19b, 25b External air bypass
First guide
20a, 20d First opening
20b, 20e First partition
20c, 21c Outer peripheral surface
21 Second guide
21a, 21e Second opening
21b, 21f Second partition
21d Joint
22 Cover
23 Outer-facing fan
24 Inner-facing fan
31 Rotor core
31a Rotor air passage
32 Rotor conductor
33 Holding member
33a Through hole
34 Stator core
34a External air passage
34b Internal air passage
Stator conductor
36 Tubular member
37 Plate member

37a, 46a End-face air hole
38, 42 Heat transfer member
39, 43 Fitting member
40, 44 Inner fin
41,45 Outer fin
46 Support member
51 Lead wire
AR1, AR2, AR3, AR4, AR5, AR6, AR7, AR8, AR9, AR10, AR11, AR12, AR13, AR14,
AR15 Arrow
AX Rotation axis

The invention claimed is:

1. An electric motor comprising:

a shaft supported rotatably about a rotation axis;

a rotor located radially outward from the shaft and rotatable integrally with the shaft;

a stator radially opposing the rotor with a space therebetween, the stator having an external air passage and an internal air passage, the external air passage and the internal air passage being each a through hole open at both ends in a direction of extension of the rotation axis such that the external air passage and the internal air passage are arranged in a circumferential direction in the stator;

a first bracket having an inlet hole that allows inflow of external air;

a second bracket opposing the first bracket in the direction of extension of the rotation axis with the rotor and the stator being located between the second bracket and the first bracket;

a heat exchanger comprising an internal air bypass located radially outward from the internal air passage, an external air bypass located radially outward from the internal air bypass, the external air bypass being continuous to an external space, and a heat transfer member to separate the internal air bypass and the external air bypass, and transfer heat from internal air flowing in the internal air bypass to the external air flowing in the external air bypass;

a first guide disposed between the first bracket and the stator, the first guide being configured to guide the external air drawn in via the inlet hole to the external air passage, and to prevent the inflow external air from entering the internal air passage and the internal air bypass; and a second guide disposed between the second bracket and the stator, the second guide being configured to guide the external air after passing through the external air passage to the external space, guide the internal air to the internal air passage and the internal air bypass, and prevent the external air from entering the internal air passage and the internal air bypass.

2. The electric motor according to claim 1, wherein the rotor has a rotor air passage, the rotor air passage being a through hole open at both ends in the direction of extension of the rotation axis, the first guide guides the internal air after passing through the internal air passage and the internal air bypass to the rotor air passage, and the second guide guides the internal air after passing through the rotor air passage to the internal air passage and the internal air bypass.

3. The electric motor according to claim 1, further comprising:

an outer-facing fan attached to the shaft at a position between the first bracket and the stator, the outer-facing fan being configured to rotate integrally with the shaft.

4. The electric motor according to claim 3, wherein the external air drawn in via the inlet hole flows radially in accordance with rotation of the outer-facing fan, and is guided by the first guide to the external air passage.

5. The electric motor according to claim 1, further comprising:

an inner-facing fan attached to the shaft at a position between the second bracket and the stator such that a circumferential edge of the inner-facing fan is adjacent to the second guide, the inner-facing fan being configured to rotate integrally with the shaft.

6. The electric motor according to claim 5, wherein the internal air flows radially in accordance with rotation of the inner-facing fan, and is guided by the second guide to the internal air passage and the internal air bypass.

7. The electric motor according to claim 1, wherein the first guide guides the external air drawn in via the inlet hole to the external air passage and the external air bypass.

8. The electric motor according to claim 1, wherein
the heat exchanger further comprises a plurality of outer fins attached to the heat transfer member with air gaps therebetween, the plurality of outer fins extending in the direction of extension of the rotation axis, and
the air gaps between the plurality of outer fins define the external air bypass.

9. The electric motor according to claim 8, further comprising:

a cover disposed over at least parts of the plurality of outer fins, the parts including one ends of the plurality of outer fins closer to the first guide.

10. The electric motor according to claim 1, wherein
the heat exchanger further comprises a plurality of outer fins attached to the heat transfer member with air gaps therebetween, the plurality of outer fins having main surfaces located in planes intersecting the rotation axis, and
the air gaps between the plurality of outer fins define the external air bypass.

11. The electric motor according to claim 1, wherein the heat exchanger further comprises a plurality of inner fins attached to the heat transfer member with air gaps therebetween, the plurality of inner fins extending in the direction of extension of the rotation axis within the internal air bypass.

12. The electric motor according to claim 1, further comprising:

a frame having a hollow tubular shape, the frame being configured to accommodate the shaft, the rotor, and the stator, wherein
the stator has an outer peripheral surface that is in contact with an inner peripheral surface of the frame,
the first bracket and the second bracket are attached to the frame while holding the frame therebetween in the direction of extension of the rotation axis,
the frame has an end closer to the second bracket, the end having an outlet hole through which the external air after passing through the external air passage is discharged, and
the second guide guides the external air after passing through the external air passage to the outlet hole.

13. The electric motor according to claim 12, wherein the heat transfer member of the heat exchanger is located radially outward from the frame, is attached to an outer peripheral surface of the frame, and defines the internal air bypass with the outer peripheral surface of the frame.

14. The electric motor according to claim 13, wherein the frame includes
a tubular member having a hollow tubular shape, and
a plate member disposed over one end of the tubular member and having an end-face air hole,
the first guide is accommodated in the frame and has a hollow tubular shape, so as to be attached to the plate member at a position radially inward from the end-face air hole of the plate member and attached to the stator at a position radially inward from the external air passage and the internal air passage of the stator,
the tubular member has a portion facing the first guide, and the portion has a first air hole continuous to the external air bypass and a second air hole continuous to the internal air bypass,
the first guide has an outer peripheral surface having a first opening facing the second air hole,
the outer peripheral surface of the first guide further has a first partition extending from a periphery of the first opening in a direction away from the outer peripheral surface of the first guide, the first partition being configured to separate the first air hole and the second air hole and separate the external air passage and the internal air passage, and
the first guide guides a part of the external air drawn in via the inlet hole and passing through the end-face air hole to the external air passage, and guides another part of the external air to the external air bypass via the first air hole.

15. The electric motor according to claim 14, wherein
the second guide is accommodated in the frame and has a hollow tubular shape, so as to be attached to the stator at a position radially inward from the external air passage and the internal air passage of the stator and attached to the tubular member,
the tubular member has a portion facing the second guide, and the portion has a third air hole continuous to the internal air bypass,
the second guide has an outer peripheral surface having a second opening facing the third air hole,
the outer peripheral surface of the second guide further has a second partition extending from a periphery of the second opening toward the tubular member, the second partition being configured to separate the external air passage and the internal air passage, and
the second guide guides a part of the internal air to the internal air passage via the second opening, and guides another part of the internal air to the internal air bypass via the second opening and the third air hole.

16. The electric motor according to claim 1, wherein
the first bracket and the second bracket are attached to the stator at a position radially outward from the external air passage and the internal air passage of the stator,
the second bracket has an outlet hole through which the external air after passing through the external air passage is discharged, and
the second guide guides the external air after passing through the external air passage to the outlet hole.

17. The electric motor according to claim 16, wherein the heat transfer member of the heat exchanger is attached to an outer peripheral surface of the first bracket and an outer peripheral surface of the second bracket, and defines the internal air bypass with the outer peripheral surface of the first bracket, an outer peripheral surface of the stator, and the outer peripheral surface of the second bracket.

18. The electric motor according to claim 17, wherein the first bracket has a first air hole continuous to the external air bypass and a second air hole continuous to the internal air bypass, the first guide is accommodated in the first bracket and has a hollow tubular shape, so as to be attached to the stator at a position radially inward from the external air passage and the internal air passage of the stator and attached to the first bracket, the first guide has an outer peripheral surface having a first opening facing the second air hole, the outer peripheral surface of the first guide further has a first partition extending from a periphery of the first opening toward the first bracket, the first partition being configured to separate the first air hole and the second air hole and separate the external air passage and the internal air passage, and the first guide guides a part of the external air drawn in via the inlet hole to the external air passage, and guides another part of the external air to the external air bypass via the first air hole.

19. The electric motor according to claim 18, wherein the second guide is accommodated in the second bracket and has a hollow tubular shape, so as to be attached to the stator at a position radially inward from the external air passage and the internal air passage of the stator and attached to the second bracket, the second bracket has a third air hole continuous to the internal air bypass, the second guide has an outer peripheral surface having a second opening facing the third air hole, the outer peripheral surface of the second guide further has a second partition extending from a periphery of the second opening toward the second bracket, the second partition being configured to separate the external air passage and the internal air passage, and the second guide guides a part of the internal air to the internal air passage via the second opening, and guides another part of the internal air to the internal air bypass via the second opening and the third air hole.

20. The electric motor according to claim 1, wherein the is electric motor includes a plurality of the heat exchangers, and the first guide guides a part of the external air drawn in via the inlet hole to the external air passage, and guides another part of the external air to external air bypasses of the plurality of heat exchangers.

\* \* \* \* \*